(12) United States Patent
Kaler et al.

(10) Patent No.: US 7,475,097 B2
(45) Date of Patent: *Jan. 6, 2009

(54) PROJECT-BASED CONFIGURATION MANAGEMENT METHOD AND APPARATUS

(75) Inventors: Christopher G. Kaler, Redmond, WA (US); Steven J. Kruy, Carnation, WA (US); Martyn S. Lovell, Seattle, WA (US); Michael J. Grier, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 433 days.

This patent is subject to a terminal disclaimer.

(21) Appl. No.: 10/996,719

(22) Filed: Nov. 24, 2004

(65) Prior Publication Data

US 2005/0091291 A1    Apr. 28, 2005

Related U.S. Application Data

(60) Continuation of application No. 10/851,945, filed on May 21, 2004, now Pat. No. 6,973,466, which is a division of application No. 09/717,723, filed on Nov. 21, 2000, now Pat. No. 6,766,334.

(51) Int. Cl.
*G06F 17/30* (2006.01)
(52) U.S. Cl. .............. 707/203; 707/9; 717/121
(58) Field of Classification Search ........ 707/9, 707/200, 203, 100, 102, 8, 201, 104.1, 103 R, 707/103 X, 103 Y, 103 Z; 717/101, 102, 717/121, 122, 123

See application file for complete search history.

(56) References Cited

U.S. PATENT DOCUMENTS 4,809,170 A   2/1989   Leblang et al. ............ 364/200

(Continued)

OTHER PUBLICATIONS

Kilpi, T., New Challenges for Version Control and Configuration Management a Framework and Evaluation, Software Maintence and Reengineering, 1997. Euromicro 97., First Euromicro Conference on Mar. 17-19, 1997 pp. 33-41.*

(Continued)

*Primary Examiner*—Greta L Robinson
(74) *Attorney, Agent, or Firm*—Woodcock Washburn LLP

(57) ABSTRACT

A configuration management system creates (602) each configuration by assigning a configuration identifier to each configuration. In addition, relational information is computed (706) that indicates the relationships between the configuration and any configurations upon which it is based. The system then tracks (604) changes to files of the configuration by storing information associating each new file version with the configuration identifier. The system also tracks (1210) changes to file properties. A configuration is then reconstructed (608) as of a desired date, by identifying (2104, 2106) the file versions and properties associated with that configuration as of the desired date. A determination is made (2110) whether a user that has requested the file versions has access privileges by first checking a security cache (2600) for the user privileges information. If the information is not on the cache, it is computed from a security table (2800) and stored on the cache. The system automatically compresses (3118) and reconstitutes (3006) file versions that are stored in the version store.

2 Claims, 23 Drawing Sheets

U.S. PATENT DOCUMENTS

| | | | | |
|---|---|---|---|---|
| 5,574,898 | A | | 11/1996 | Leblang et al. ............. 395/601 |
| 5,592,661 | A | * | 1/1997 | Eisenberg et al. ........... 707/102 |
| 5,649,200 | A | * | 7/1997 | Leblang et al. ............. 717/122 |
| 5,675,802 | A | | 10/1997 | Allen et al. ................. 395/703 |
| 5,729,743 | A | | 3/1998 | Squibb ....................... 395/619 |
| 5,857,207 | A | | 1/1999 | Lo et al. ..................... 707/203 |
| 5,890,166 | A | * | 3/1999 | Eisenberg et al. ........... 707/203 |
| 5,983,241 | A | | 11/1999 | Hoshino .................... 707/203 |
| 6,061,693 | A | | 5/2000 | Carney et al. ............... 707/200 |
| 6,182,121 | B1 | | 1/2001 | Wlaschin .................... 709/215 |
| 6,341,291 | B1 | | 1/2002 | Bentley et al. .............. 707/203 |
| 6,449,624 | B1 | * | 9/2002 | Hammack et al. ........... 707/203 |
| 6,460,052 | B1 | | 10/2002 | Thomas et al. .............. 707/203 |
| 6,631,386 | B1 | * | 10/2003 | Arun et al. .................. 707/203 |
| 6,766,334 | B1 | | 7/2004 | Kaler et al. ................. 707/203 |
| 6,973,466 | B2 | * | 12/2005 | Kaler et al. ................. 707/203 |
| 7,100,195 | B1 | * | 8/2006 | Underwood ................... 726/2 |

OTHER PUBLICATIONS

Katz, R.H., Toward a Unified framework for Version Modeling in Engineering Databases, Computer Science Division, Electrical Engineering and Computer Science Department, University of California, Berkeley, California 94720, ACM Computer Survey, Dec. 1990, 22(4), 375-408.*

Hoeven et al., A Flexible Access Control Mechanisum for CAD Frameworks, European Design Automation Conference Proceedings of the Conference on European Design Automation, Grenoble France, 1994, pp. 188-193.*

Chou, H. et al., "A Unifying Framework for Version Control in a CAD Environment", Microelectronics and Computer Technology Corporation, Aug. 1986, 336-344.

Miller, D.B. et al., "An Inverted Approach to Configuration Management", AMC Press Proceedings of the 2nd International Workshop on Software Configuration Management, School of Computer Science, Carnegie Mellon University, Oct. 24, 1999, 6 pages.

* cited by examiner

900

| 902 | 904 | 906 |
|---|---|---|
| CONFIG NAME | CONFIG ID | OTHER INFORMATION |
| CONFIG A | A | |
| CONFIG B | B | |
| CONFIG C | C | |

908 → (points to CONFIG C row)

| | 1002 | 1004 | 1006 | 1008 |
|---|---|---|---|---|
| | CONFIG ID | LOWER LIMIT | UPPER LIMIT | RELATIONAL INFORMATION |
| 1010 | A | 0 | ∞ | A from 0 -> infinity |
| 1011 | B | 0 | ∞ | B from 0 -> infinity |
| 1012 | B | 0 | ∞ | A from 0 -> 3 |
| 1013 | C | 0 | ∞ | C from 0 -> infinity |
| 1014 | C | 0 | ∞ | B from 0 -> 1 |
| 1015 | C | 0 | ∞ | A from 0 -> 3 |
| | ... | | | |

*FIG. 10*

| | 1302 | 1303 | 1304 | 1305 | 1306 | 1307 | 1308 | 1310 | 1312 |
|---|---|---|---|---|---|---|---|---|---|
| | FILENAME/PATH | MOVED TO | MOVED TO | FILE ID | VERSION | VERSION ID | MARKER | DATE/TIME | CONFIG ID |
| 1320 | C:\DIR\one.doc | C:\OTHER\one.doc | | 123 | 1 | 1 | 1 | 01/01/99; 06:00:00 | A |
| 1321 | C:\DIR\two.doc | C:\DIR\dos.doc | | 456 | 1 | 1 | 2 | 01/01/99; 06:00:00 | A |
| 1322 | C:\OTHER\one.doc | C:\OTHER\one.doc | | 123 | 2 | 2 | 3 | 02/17/99; 07:30:15 | A |
| 1323 | C:\DIR\one.doc | C:\OTHER\one.doc | | 123 | 3 | 4 | 4 | 03/04/99; 11:22:21 | A |
| 1324 | C:\DIR\one.doc | C:\OTHER\one.doc | | 123 | 4 | 5 | 5 | 04/12/99; 17:02:11 | A |
| 1325 | C:\DIR\two.doc | C:\DIR\dos.doc | | 456 | 2 | 6 | 6 | 05/29/99; 08:45:41 | A |
| 1326 | C:\OTHER\one.doc | | C:\DIR\one.doc | 123 | 5 | 7 | 1 | 06/10/1999; 12:33:02 | B |
| 1327 | C:\OTHER\one.doc | | C:\DIR\one.doc | 123 | 6 | 8 | 7 | 07/01/1999; 14:11:54 | A |
| 1328 | C:\DIR\two.doc | C:\DIR\dos.doc | | 456 | 3 | 9 | 1 | 07/01/99; 14:11:54 | C |
| 1329 | C:\OTHER\one.doc | | C:\DIR\one.doc | 123 | 7 | 10 | 2 | 08/22/99; 07:52:32 | B |
| 1330 | C:\DIR\dos.doc | | C:\DIR\two.doc | 456 | 4 | 11 | 8 | 09/16/99; 15:13:02 | A |
| 1331 | C:\DIR\dos.doc | | C:\DIR\two.doc | 456 | 5 | 12 | 2 | 09/16/99; 15:13:02 | C |
| 1332 | C:\OTHER\one.doc | | C:\DIR\one.doc | 123 | 8 | 13 | 9 | 10/17/99; 18:01:44 | A |
| 1333 | C:\DIR\dos.doc | | C:\DIR\one.doc | 456 | 9 | 14 | 10 | 11/30/99; 11:54:43 | A |
| 1334 | C:\OTHER\one.doc | | C:\DIR\one.doc | 123 | 9 | 15 | 3 | 12/07/99; 13:33:12 | B |
| 1335 | C:\DIR\dos.doc | | C:\DIR\one.doc | 123 | 10 | 16 | 11 | 01/30/00; 16:56:23 | A |
| 1336 | C:\OTHER\one.doc | | C:\DIR\one.doc | 123 | 11 | 17 | 4 | 02/24/00; 06:59:00 | B |
| 1337 | C:\DIR\dos.doc | | C:\DIR\two.doc | 456 | 7 | 18 | 12 | 03/06/00; 10:14:39 | A |

| PROPERTY NAME | PROPERTY ID |
|---|---|
| PROP1 | 111 |
| PROP2 | 222 |
| PROP3 | 333 |

| | PROPERTY ID | VALUE | FILE ID | VERSION ID | CONFIG ID | MARKER | DATE/TIME |
|---|---|---|---|---|---|---|---|
| 1521 | 111 | 0 | 456 | 2 | A | 2 | 01/01/99; 06:00:00 |
| 1522 | 222 | TRUE | 123 | 1 | A | 1 | 01/01/99; 06:00:00 |
| 1523 | 333 | 21 | 123 | 1 | A | 1 | 01/01/99; 06:00:00 |
| 1524 | 111 | 7 | 456 | 6 | A | 6 | 05/29/99; 08:45:41 |
| 1525 | 222 | FALSE | 123 | 8 | A | 7 | 07/01/99; 14:11:54 |

1502  1504  1506  1507  1508  1510  1512

1900

| | CONFIG ID | LOWER LIMIT | UPPER LIMIT | RELATIONAL INFORMATION |
|---|---|---|---|---|
| | 1002 | 1004 | 1006 | 1006 |
| 1010 | A | 0 | ∞ | A from 0 --> infinity |
| 1011 | B | 0 | 2 | B from 0 --> infinity |
| 1012 | B | 0 | 2 | A from 0 --> 3 |
| 1013 | C | 0 | ∞ | C from 0 --> infinity |
| 1014 | C | 0 | ∞ | B from 0 --> 1 |
| 1015 | C | 0 | ∞ | A from 0 --> 3 |
| 1910 | B | 3 | ∞ | B from 3 --> infinity |
| 1911 | B | 3 | ∞ | A from 4 --> 6 |
| 1912 | B | 3 | ∞ | B from 1 --> 2 |
| 1913 | B | 3 | ∞ | A from 1 --> 3 |

*FIG. 19*

| | OPERATION TYPE (2002) | ORIGINATING CONFIGURATION (2004) | ORIGINATING FILE ID (2006) | ORIGINATING VERSION (2008) | DESTINATION CONFIGURATION (2010) | DESTINATION FILE ID (2012) | DESTINATION VERSION (2014) |
|---|---|---|---|---|---|---|---|
| 2021 | COPY | B | 789 | 1 | C | 999 | 1 |
| 2022 | MERGE | C | 999 | 2 | B | 789 | 3 |

| | 1302 FILENAME/PATH | 1303 MOVED TO | 1304 MOVED FROM | 1305 FILE ID | 1306 VERSION | 1307 VERSION ID | 1308 MARKER | 1310 DATE/TIME | 1312 CONFIG ID |
|---|---|---|---|---|---|---|---|---|---|
| 2301 | C:\DIR\one.doc | C:\OTHER\one.doc | | 123 | 1 | 1 | 1 | 01/01/99; 06:00:00 | A |
| 2302 | C:\DIR\one.doc | C:\OTHER\one.doc | | 123 | 2 | 2 | 3 | 02/17/99; 07:30:15 | A |
| 2303 | C:\DIR\one.doc | C:\OTHER\one.doc | | 123 | 3 | 4 | 4 | 03/04/99; 11:22:21 | A |
| 2304 | C:\DIR\one.doc | C:\OTHER\one.doc | | 123 | 4 | 5 | 5 | 04/12/99; 17:02:11 | A |
| 2305 | C:\OTHER\one.doc | | C:\DIR\one.doc | 123 | 5 | 7 | 1 | 06/10/1999; 12:33:02 | B |
| 2306 | C:\OTHER\one.doc | | C:\DIR\one.doc | 123 | 6 | 8 | 7 | 07/01/1999; 14:11:54 | A |
| 2307 | C:\OTHER\one.doc | | C:\DIR\one.doc | 123 | 7 | 10 | 2 | 08/22/99; 07:52:32 | B |
| 2308 | C:\OTHER\one.doc | | C:\DIR\one.doc | 123 | 8 | 13 | 9 | 10/17/99; 18:01:44 | A |
| 2309 | C:\OTHER\one.doc | | C:\DIR\one.doc | 123 | 9 | 15 | 3 | 12/07/99; 13:33:12 | B |
| 2310 | C:\OTHER\one.doc | | C:\DIR\one.doc | 123 | 10 | 16 | 11 | 01/30/00; 16:56:23 | A |
| 2311 | C:\OTHER\one.doc | | C:\DIR\one.doc | 123 | 11 | 17 | 4 | 02/24/00; 06:59:00 | B |
| 2312 | C:\DIR\two.doc | C:\DIR\dos.doc | | 456 | 1 | 2 | 2 | 01/01/99; 06:00:00 | A |
| 2313 | C:\DIR\two.doc | C:\DIR\dos.doc | | 456 | 2 | 6 | 6 | 05/29/99; 08:45:41 | A |
| 2314 | C:\DIR\two.doc | C:\DIR\dos.doc | | 456 | 3 | 9 | 1 | 07/01/99; 14:11:54 | C |
| 2315 | C:\DIR\dos.doc | | C:\DIR\two.doc | 456 | 4 | 11 | 8 | 09/16/99; 15:13:02 | A |
| 2316 | C:\DIR\dos.doc | | C:\DIR\two.doc | 456 | 5 | 12 | 2 | 09/16/99; 15:13:02 | C |
| 2317 | C:\DIR\dos.doc | | C:\DIR\two.doc | 456 | 6 | 14 | 10 | 11/30/99; 11:54:43 | A |
| 2318 | C:\DIR\dos.doc | | C:\DIR\two.doc | 456 | 7 | 18 | 12 | 03/06/00; 10:14:39 | A |

| USER ID (2602) | SECURITY ID (2604) | USER CAPABILITIES (2606) | TIME/DATE (2608) |
|---|---|---|---|
| 4 | 171 | | 12/5/99; 14:43:27 |
| 7 | 214 | | 12/4/99; 11:02:12 |
| 2 | 3 | | 12/4/99; 07:51:53 |
| 1 | 54 | | 12/4/99; 16:22:39 |

| USER ID (2802) | SECURITY ID (2804) | ACCESS TOKEN (2806) | SECURITY DESCRIPTOR (2808) |
|---|---|---|---|
| 1 | 54 | | |
| 2 | 3 | | |
| 3 | 345 | | |
| 4 | 171 | | |

*FIG. 28*

| | 2902 | 2904 | 2906 | 2908 | 2910 | 2912 |
|---|---|---|---|---|---|---|
| 2900 | FILE ID | VERSION | REQUEST COUNTER | COMPRESSION TYPE | RECONSTITUTION STATUS | DATE/TIME |
| | 123 | 1 | 3 | REVERSE | NO | |
| | 123 | 2 | 21 | REVERSE | NO | |
| | 123 | 3 | 0 | NONE | NO | |
| | 456 | 1 | 0 | NONE | YES | 06/01/99; 07:30:11 |
| | 456 | 2 | 0 | NONE | NO | |

FIG. 29

PROJECT-BASED CONFIGURATION MANAGEMENT METHOD AND APPARATUS

CROSS-REFERENCE to RELATED APPLICATIONS

This application is a continuation of U.S. Pat. No. 6,973,466 filed May 21, 2004 which is a divison of application Ser. No. 09/717,723, filed Ser. No. 11/21/2000, now U.S. Pat. No. 6,766,334,issued on Jul. 20, 2004, the disclosure of which are incorporated herein by reference in their entirety.

TECHNICAL FIELD

The invention relates generally to configuration management systems and methods and, more particularly, to systems and methods for reconstructing prior versions of software configurations created in the context of parallel development.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright® 1998, Microsoft Corporation, All Rights Reserved.

BACKGROUND OF THE INVENTION

Many software and Web site applications are created in the context of parallel development, where multiple individuals create and modify numerous files produced by the development language, authoring tool, or application. These projects require processes for versioning source files and for managing changes to the files that comprise the project. Configuration management systems are commonly used for version control and managing changes to file content.

Some configuration management systems merely store copies of the project files at various times. For example, a configuration management system may store the project files for a product release. These complete content configuration copies are then retained in a database for later access, if needed.

One disadvantage to merely copying configurations is that, in a large-scale project, the configuration copies can take up large amounts of disk space. Consequently, a project administrator typically may store relatively few versions of the project (e.g., only particular releases). In some cases, however, it is desirable to have the configuration management system keep track of each project build, where a build could be made as frequently as daily, although builds could be made more or less frequently, as well. A configuration management system that merely copies the database each night would be highly impractical, given the amount of disk space and copying time that would be needed.

More advanced configuration management systems are capable of reconstructing previous project configurations, rather than simply referring to archived copies of specific project configurations. These systems keep track of changes made to the project files, and determine which versions of those files apply to the desired project configuration.

Prior art configuration management systems that can reconstruct previous project configurations typically operate on the individual file level by maintaining a version graph for each file of the project. When a new version of a file is created, the version graph is updated to reflect the new version.

Prior art FIG. 1 illustrates an example of version graphs for two files, file 1 and file 2, of a multiple file project in accordance with the prior art. As shown in the Figure, the project has been changed across three project configurations: Configuration A, Configuration B, and Configuration C. For ease of illustration, each version of a file is indicated by a circle 101, 102, 103, 104, 105, 106, 107, 151, 152, 153, 154, 155, 156, and 157, and the number within the circle indicates where that particular version fits within the sequence of file versions. Thus, changes were made to file 1 sequentially from 101-107, and circles 101-107 represent the first seven versions of file 1.

The labels "Configuration_" indicate which file versions were created in the context of which project configuration. The version graph 100 for file 1 indicates that three file versions 101-103 include changes associated with Configuration A of the project. File versions 104-106 include changes associated with Configuration B, and file version 107 includes changes associated with Configuration C. Similarly, the version graph 150 for file 2 indicates that four file versions 151-153 and 155 include changes associated with Configuration A. File versions 154 and 156 include changes associated with Configuration B, and file version 157 includes changes associated with Configuration C.

At times, the system may identify certain points along each file's version graph as being part of a specific release. These identifiers are known as labels or configurations. Although multiple versions might have been created in the context of a particular configuration, only those files that are specifically identified as part of a release can later be automatically assembled into a version of the configuration.

Although a version graph may be an effective way to track changes to a particular file, FIG. 1 illustrates that version graphs fail to establish relationships between the files. Some systems do attempt to manage a collection of related files, but they typically do so in an ad-hoc fashion that is complicated to manage and time consuming to implement. Consider a standard file-oriented configuration management system (such as the UNIX utility RCS), which essentially is a collection of tools that operate on individual files, controlling file access and updates and comparing previous versions. To access and modify a group of files controlled by the system, an individual would need to write a special batch file or specify wildcards on the command line. Thus, the process of accessing the file versions for a particular configuration is a manual one, requiring each individual to have an in-depth knowledge of the project file structure.

Another disadvantage to prior art systems is that, although many systems effectively manage content changes to files, many do not effectively manage namespace changes, such as renaming files and moving files from one drive or folder to another. This inability to effectively manage namespace changes occurs because the filename of each file is generally used as a primary identifier in prior art systems. Thus, if a filename is changed or the file is moved from one drive or folder to another, the configuration management system would behave as if the file was deleted, and a new file was added to the system. In general, no historical link would exist between the previous version of the file, and the renamed or moved file. Even in a system where a historical link would exist, it would not typically be treated as a "first class" change, with the same ability to merge, move, and apply the change as if it were a change to the file's content. Thus, unless an individual knows the name or location of the original file, it would not be possible to trace back and find the original file.

This inability of prior art systems to manage namespace changes is particularly problematic for Web site development projects, where namespaces are a primary element of the software system.

A few prior art configuration management systems are project-oriented. One such system is the "MICROSOFT"® "VISUAL SOURCESAFE"™ version control system. Using this system, when an individual retrieves, modifies, and checks a file back in, the system records information indicating that a change to the file content may have occurred. This information is stored in a project history file. The system also stores information in the history file each time a file is added, modified, shared, moved or deleted from a project. This historical record can be output as a report, and an individual can use the report to pinpoint bugs or to manually recreate previous versions of the project. In the context of VISUAL SOURCESAFE, however, there is limited support for projects that span more than one folder. In addition, in an ideal world, the process of recreating previous versions of a project would be automatic, and thus transparent to the individual.

Although prior art systems do provide version control for the actual files of a project, one other feature that is lacking from prior art systems is that many of these systems do not adequately version file properties. Thus, they provide no way of rebuilding properties associated with previous versions of files. An individual using a prior art system would need to know what properties applied to what files at what times, as well as the values of those properties. In some cases, this information may be stored by the system, but the individual would have to link the files and their properties manually. This lack of property support has forced prior art systems to express all their internal structure in terms of textual files, which is both inefficient and destroys the end user's ability to query.

In an era where parallel development is extensively used to create complex software applications and Web sites, version control is further complicated. In the context of parallel development, an individual may check out and modify a configuration of the project while the main product configuration also is being modified. The individual may later want to resynchronize his or her configuration with the main product configuration, pulling new changes made to the main product configuration into his or her copy of the configuration. This resynchronization requires the use of differencing and merging techniques, which are implemented separately from prior art configuration management systems. In some cases, information regarding the relationships between files in different configurations is essential to accurately merge these files together. However, many other prior art systems do not maintain and provide this type of information automatically to the differencing and merging processes.

Another deficiency of prior art configuration management systems is that they do not adequately provide access control for multiple file versions spread across multiple configurations. During development of a large multi-file project, it may be desirable to allow some users to have certain access privileges for the files associated with some configurations, but different privileges for the files of other configurations. Current configuration management systems are unable to provide different access privileges for files of different configurations.

Essentially, what is needed is a configuration management system and method that enables an individual to automatically and efficiently recreate any prior project configuration exactly as it was at any time in the past, without consuming undue amounts of memory or disk space, and without being adversely affected by namespace changes. Specifically, what is needed is a configuration management system and method that can automatically trace back to all previous versions of files, even when those files have been moved or renamed. What is also needed is a configuration management system that is able automatically to reconstruct file properties as they were at any previous time. What is further needed is a configuration management system and method that provides access control for multiple file versions associated with various configurations of a project.

SUMMARY OF THE INVENTION

A method for providing configuration management for a multiple-file project creates a configuration by assigning a configuration identifier to the configuration. Historical data is tracked that pertains to changes to files that are associated with the configuration. This is done by storing information that associates the identities of new file versions with the configuration identifier, where the new file versions resulted from changes to the files. The configuration can be reconstructed as of a desired date by determining, from the historical data and the configuration identifier, a set of file versions that comprise the configuration as of the desired date.

When a change has been made to a property of a file that is associated with the configuration, historical information describing the change is stored. The historical information includes a property identifier that identifies the property, a value of the property, and a file identifier that identifies the file.

Information describing the relationships between files of various configurations is also stored. When a request is received to incorporate changes from one configuration into another configuration, this information is modified to reflect new relationships between the files of those configurations.

Information is stored describing operations that copy a first version of a file from an originating configuration into a destination configuration. When a request is received to perform a merge operation that will merge, from the destination configuration into the originating configuration, a second version of the file that is a modified version of the first version, a determination is made, whether the first version of the file should be included in the merge operation. If the information indicates that the first version is to be included in the merge operation, the first version is included.

To construct a desired configuration of the project as of a desired time, the configuration identifier for the desired configuration is determined. Versions of the multiple files that are to be included in the desired configuration are identified as a set of the versions that are associated with the configuration identifier at the desired time. The set of versions is then assembled.

A determination is made whether a user has access privileges to file versions of the desired configuration by first determining whether a record for the user exists in a security cache. The security cache includes user capabilities information for users who have requested access to files of the project.

If no record exists for the user, the user capabilities information is determined from an access token for the user and security descriptors for the system, wherein the access token and security descriptors are stored in a security table, which is separate from the security cache. A new record is then added to the security cache that includes the user capabilities for the user. From the user capabilities information and from information describing all versions of all files managed by the system, a determination is made whether the user has the access privileges to the file versions of the desired configuration.

Compressed versions of files within a version store are automatically reconstituted by monitoring a number of requests for a full content version of a file that is stored as a compressed version in the version store. If the number of requests exceeds a threshold, the file is reconstituted to a full content version of the file. The full content version is stored in the version store.

Versions of files stored within a version store are automatically compressed by determining whether versions of a file that are earlier than a latest version are stored in a compressed state in the version store. If the versions are not stored in a compressed state, at least one of the versions is compressed and stored in the version store. In one embodiment, compression uses "lossless" compression techniques. In another embodiment, compression is achieved by comparing "deltas" of file changes from previous versions.

A computer-readable medium has computer-executable instructions for performing the above.

A configuration management system includes a processing unit, a system bus, and a computer-readable media. The processing unit and the computer-readable media are coupled through the system bus. The processing unit creates a configuration by assigning a configuration identifier to the configuration. The unit also tracks historical data pertaining to changes to files that are associated with the configuration by storing information associating the identifies of new file versions with the configuration identifier. The unit reconstructs the configuration as of a desired date by determining, from the historical data and the configuration identifier, a set of file versions that comprise the configuration as of the desired date. The computer-readable media stores the configuration identifier, the historical data, and the set of file versions.

BRIEF DESCRIPTION OF THE DRAWINGS

FIG. 9 illustrates an example of a Configuration Table in accordance with one embodiment of the method illustrated in FIG. 8;

FIG. 10 illustrates an example of a Relational Table in accordance with one embodiment of the method illustrated in FIG. 8;

FIG. 13 illustrates an example of a File Contents Table in accordance with one embodiment of the method illustrated in FIG. 12;

FIG. 14 illustrates an example of a Properties Table in accordance with one embodiment of the method illustrated in FIG. 12;

FIG. 15 illustrates an example of a Property Contents Table in accordance with one embodiment of the method illustrated in FIG. 12;

FIG. 19 illustrates a second example of a Relational Table in accordance with one embodiment of the method illustrated in FIG. 18;

FIG. 20 illustrates an example of a Change Tracking Table in accordance with one embodiment of the present invention;

FIG. 23 illustrates an example of a re-grouped File Contents Table in accordance with one embodiment of the method illustrated in FIG. 22;

FIG. 26 illustrates an example of a Security Cache in accordance with one embodiment of the method illustrated in FIG. 25;

FIG. 28 illustrates an example of a Security Table in accordance with one embodiment of the method illustrated in FIG. 25;

FIG. 29 illustrates an example of a File Compression Data Table in accordance with one embodiment of the present invention;

DETAILED DESCRIPTION

Terminology

The following definitions are provided in order to make the detailed description more easily understandable.

"Change" means a change to a file's content, filename, location or properties.

"Configuration" (abbreviated "Config") means one of any number of combinations of file versions that, when assembled, forms a variant of a project. Each configuration can be independently manipulated, and each exists in a workspace that is logically separate from other configurations. For example, one configuration may exist in the official project workspace on a network, and another configuration may exist on an individual's personal computer.

"Configuration version" means one of any number of variants of a particular configuration, where each variant is based on the original configuration plus a set of changes to the files and/or properties that comprise the configuration.

"Containing configuration" means a configuration with which a file version is associated, where each file version may be associated with more than one configuration.

"File" means a distinct object that forms part of a project. The file may include, for example, code (e.g., source code, executable code, etc.), a document, a data structure, video or audio data, or any other type of object that may form a part of a project.

"File version" means one of any number of variants of an original file, where each variant is uniquely identifiable by a version number.

"Temporal marker" means an indicator of the order of a change within a sequence of changes. The temporal marker may be a number, a date/time stamp, or any other indicator that can be used to indicate the order of changes within a sequence.

After describing, in conjunction with FIG. 2, an exemplary operating environment in which the invention may be practiced, a method for configuration management in accordance with a number of embodiments will be discussed in detail in conjunction with FIGS. 3-31.

Exemplary Operating Environment

Figure 2:
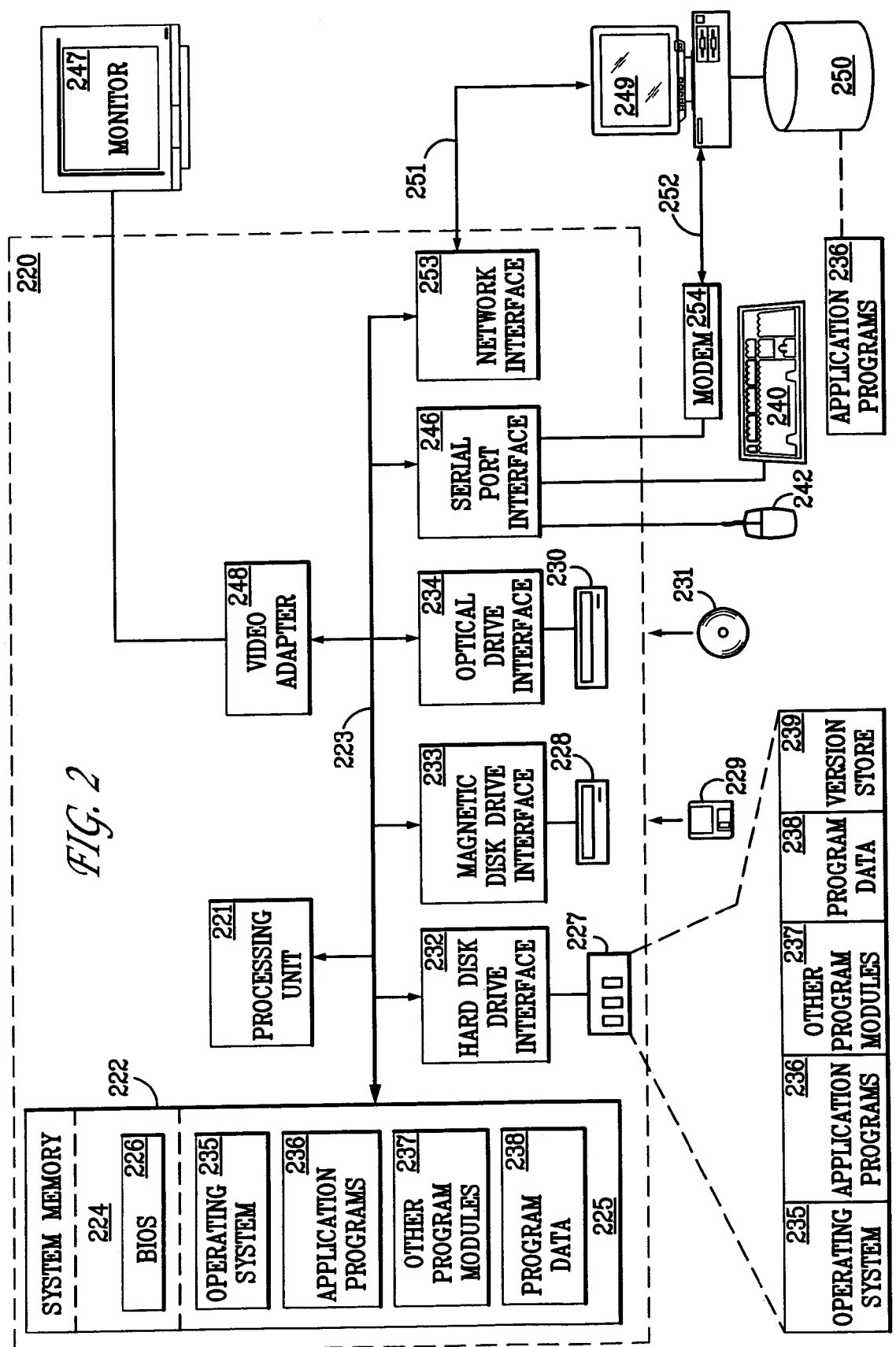
FIG. 2 illustrates an example of a system for implementing the invention in accordance with one embodiment of the present invention.

FIG. 2 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., which perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote storage media.

FIG. 2 illustrates an example of a system for implementing the invention in accordance with one embodiment of the present invention. The exemplary system includes a general purpose computing device in the form of a conventional personal computer 220, including a processing unit 221, a system memory 222, and a system bus 223 that couples various system components including the system memory 222 to the processing unit 221. The system bus 223 may be any of several types of bus structures including a memory bus or memory controller, a peripheral bus, and a local bus using any of a variety of bus architectures. The system memory includes read only memory (ROM) 224 and random access memory (RAM) 225. A basic input/output system 226 (BIOS), containing the basic routines that help to transfer information between elements within the personal computer 220, such as during start-up, is stored in ROM 224.

The personal computer 220 further includes a hard disk drive 227 for reading from and writing to a hard disk, not shown, a magnetic disk drive 228 for reading from or writing to a removable magnetic disk 229, and an optical disk drive 230 for reading from or writing to a removable optical disk 231 such as a CD ROM or other optical media. The hard disk drive 227, magnetic disk drive 228, and optical disk drive 230 are connected to the system bus 223 by a hard disk drive interface 232, a magnetic disk drive interface 233, and an optical drive interface 234, respectively.

The drives and their associated computer-readable media provide nonvolatile storage of computer readable instructions, data structures, program modules and other data for the personal computer 220. Although the exemplary environment described herein employs a hard disk, a removable magnetic disk 229, and a removable optical disk 231, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules and data structures may be stored on the hard disk, magnetic disk 229, optical disk 231, ROM 224 or RAM 225, including an operating system 235, one or more application programs 236, other program modules 237, program data 238, and version store 239. In the context of the present invention, the program modules may include all or portions of a configuration management software system, as described below, and/or a database engine. The database engine could be one of any of a number of currently-available database engines, such as the Microsoft SQL Server or Jet database engine, for example.

A user may enter commands and information into the personal computer 220 through input devices, such as a keyboard 240, pointing device 242, or other input devices (not shown). These and other input devices are often connected to the processing unit 221 through a serial port interface 246 that is coupled to the system bus, but may be connected by other interfaces, such as a parallel port, game port or a universal serial bus (USB). A monitor 247 or other type of display device is also connected to the system bus 223 via an interface, such as a video adapter 248. In addition to the monitor, personal computers typically include other peripheral output devices (not shown), such as speakers and printers.

The personal computer 220 may operate in a networked environment using logical connections to one or more remote computers, such as a remote computer 249. The remote computer 249 may be another personal computer, a server, a router, a network PC, a peer device or other common network node, and typically includes many or all of the elements described above relative to the personal computer 220, although only a storage device 250 has been illustrated in FIG. 2. The logical connections depicted in FIG. 2 include a local area network (LAN) 251 and a wide area network (WAN) 252. Such networking environments are commonplace in offices, enterprise-wide computer networks, intranets, and the Internet.

When used in a LAN networking environment, the personal computer 220 is connected to the local network 251 through a network interface or adapter 253. When used in a WAN networking environment, the personal computer 220 typically includes a modem 254 or other means for establishing communications over the WAN 252. The modem 254, which may be internal or external, is connected to the system bus 223 via the serial port interface 246. In a networked environment, program modules depicted relative to the personal computer 220, or other portions thereof, may be stored in the remote storage device. It will be appreciated that the network connections shown are exemplary and other means of establishing a communications link between the computers may be used.

In the context of the present invention, the system is required to implement several different operations. These operations include physical storage of a version store (i.e., a database in which archived versions of a project's files are stored), hosting a database engine, hosting the configuration management software, and providing a user interface that enables an individual to download, view, edit, and upload various project files.

The operations described above could be performed on multiple, distributed computers or on a single computer. For example, in one embodiment, personal computer 220 stores the entire version store on its hard disk, runs the database engine and the configuration management software, and acts as a server to multiple remote computers (e.g., remote computer 249). In an alternate embodiment, the database engine and configuration management software are run on separate, networked computers. In another embodiment, the version store is stored on multiple hard disks associated with multiple networked computers. Those of skill in the art will understand, based on the description herein, that numerous system configurations could be used to implement the method of the present invention. Accordingly, all such configurations are intended to fall within the scope of the present invention.

Method for Configuration Management

Unlike prior art systems that organize file version relationships only at the file level, the method of the present invention organizes file version relationships at both the project level and the file level. In accordance with one embodiment of the present invention, when an individual wants to reconstruct a configuration, the individual simply provides the name, date, and time of the configuration, which could be the current date and time. The system then automatically determines what versions of what files belong in the configuration, as well as what properties and property values apply to those versions. To do this, the system creates a virtual space for each configuration when the configuration is originally created. Versions of files that are created in the context of the configuration are placed within that configuration's virtual space. This is in contrast to prior art systems, in which no such virtual configuration space is created.

Figure 3:
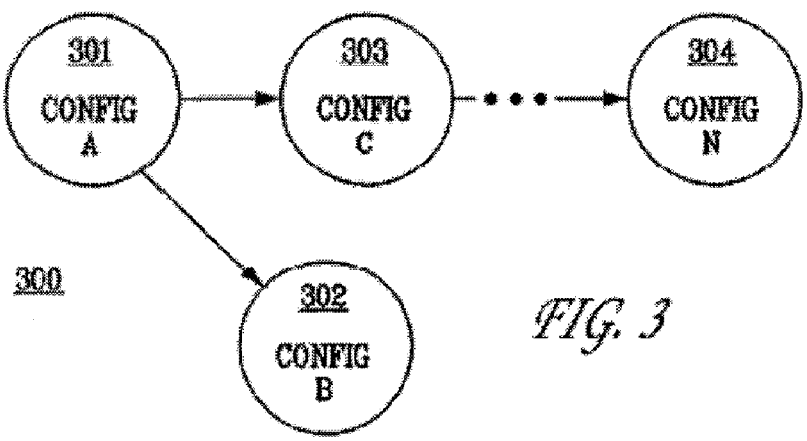
FIG. 3 illustrates an example of a configuration graph, on the project level, for a multiple file project in accordance with one embodiment of the present invention.

FIG. 3 illustrates an example of a configuration graph, on the project level, for a multiple file project in accordance with one embodiment of the present invention. For ease of illustration, each project configuration is indicated by a circle 301-304, and the letter within the circle indicates where that particular configuration fits within the sequence of project configurations. FIG. 3 shows that project Configuration B 302 and project Configuration C 303 are derived from project Configuration A 301.

File versions associated with any number, N, of project configurations can exist within the version store. As will be explained in more detail, below, all file versions associated with each project configuration 301, 302, 303 and 304 are easily identifiable.

In accordance with the present invention, within each project configuration, each file has a specific version history. In one embodiment, each file's history is essentially linear.

Figure 4:
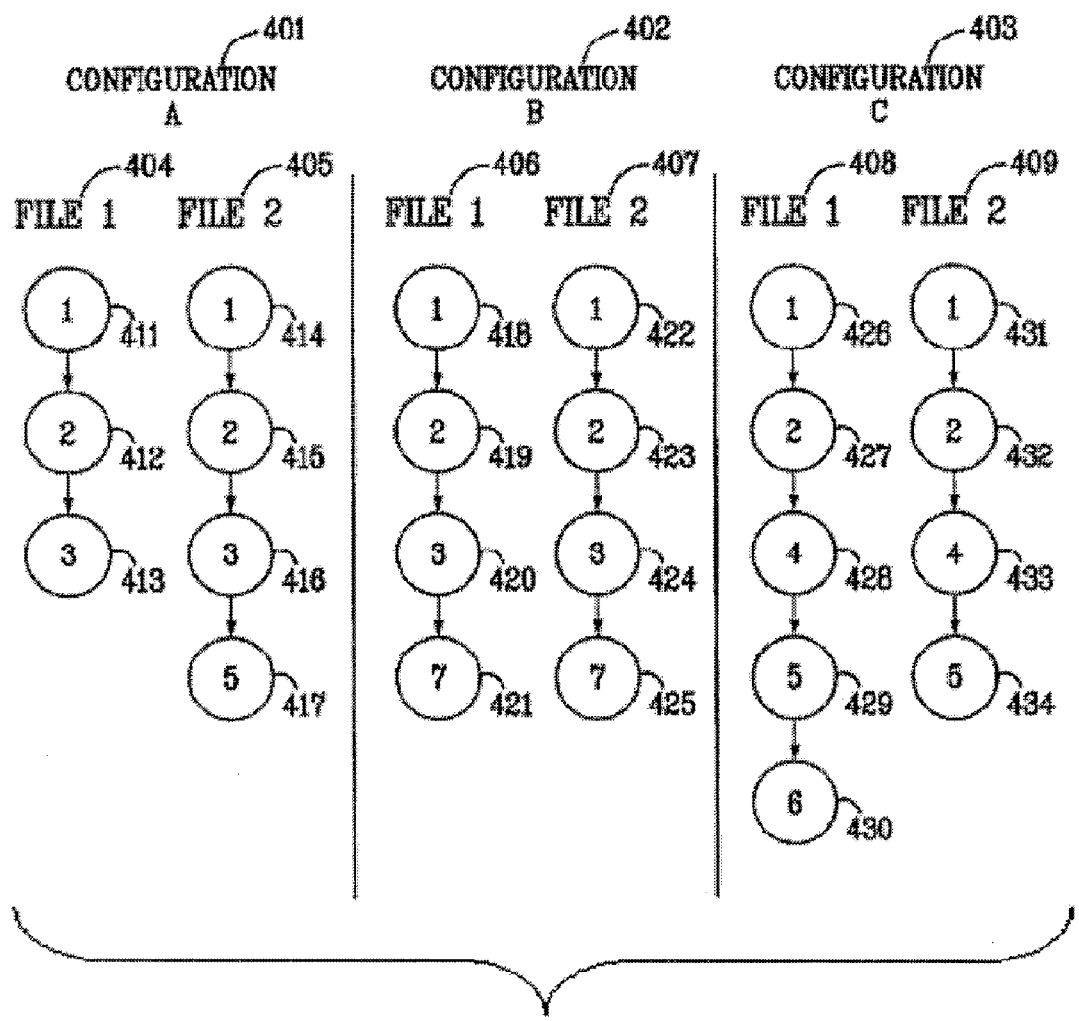
FIG. 4 illustrates examples of version graphs, on the file level, for the project depicted in FIG. 3 in accordance with one embodiment of the present invention.

FIG. 4 illustrates examples of version graphs 404, 405, 406, 407, 408 and 409, on the file level, for the project depicted in FIG. 3 in accordance with one embodiment of the present invention. The version graphs 404-409 illustrated in FIG. 4 describe the same version history that was depicted in FIG. 1 for files 1 and 2, except that the version histories are organized in a different way in accordance with one embodiment of the present invention. For ease of illustration, each version of a file is indicated by one or more circles 411, 413, 414, 415, 416, 417, 418, 419, 420, 421, 422, 423, 424, 425, 426, 427, 428, 429, 430, 431, 432, 433 and 434, and the number within the circle indicates where that particular file version fits within the sequence of changes made to the file.

Unlike the prior art, FIG. 4 illustrates that file version histories 404-409 are logically separated across project configurations 401-403, and each file version history is represented in a linear fashion. This linearity is implemented even when file versions are merged with other versions. For example, one individual may check out and modify version 2 of a file, and other individuals may subsequently check in versions 3, 4, and 5 of the same file. In order to check version 2 back into the configuration without losing the changes made by the other individuals, the first individual must first merge version 2 with version 5, resulting in a version 6. This process still results in a linear version history of versions 2, 3, 4, 5, and 6, but there will be additional metadata indicating that version 6 is a representation of version 2 merged with version 5.

In addition, each file version history 404-409 may include version information for file versions that were created in conjunction with prior project configurations. Thus, for project Configuration C 403, the version history 408 for file 1 indicates that five versions 426-430 of file 1 are associated with Configuration C 403. These include versions 1, 2, 4, 5, and 6 of file 1, where versions 1 and 2 were originally created as part of project Configuration A 401.

Figure 1:
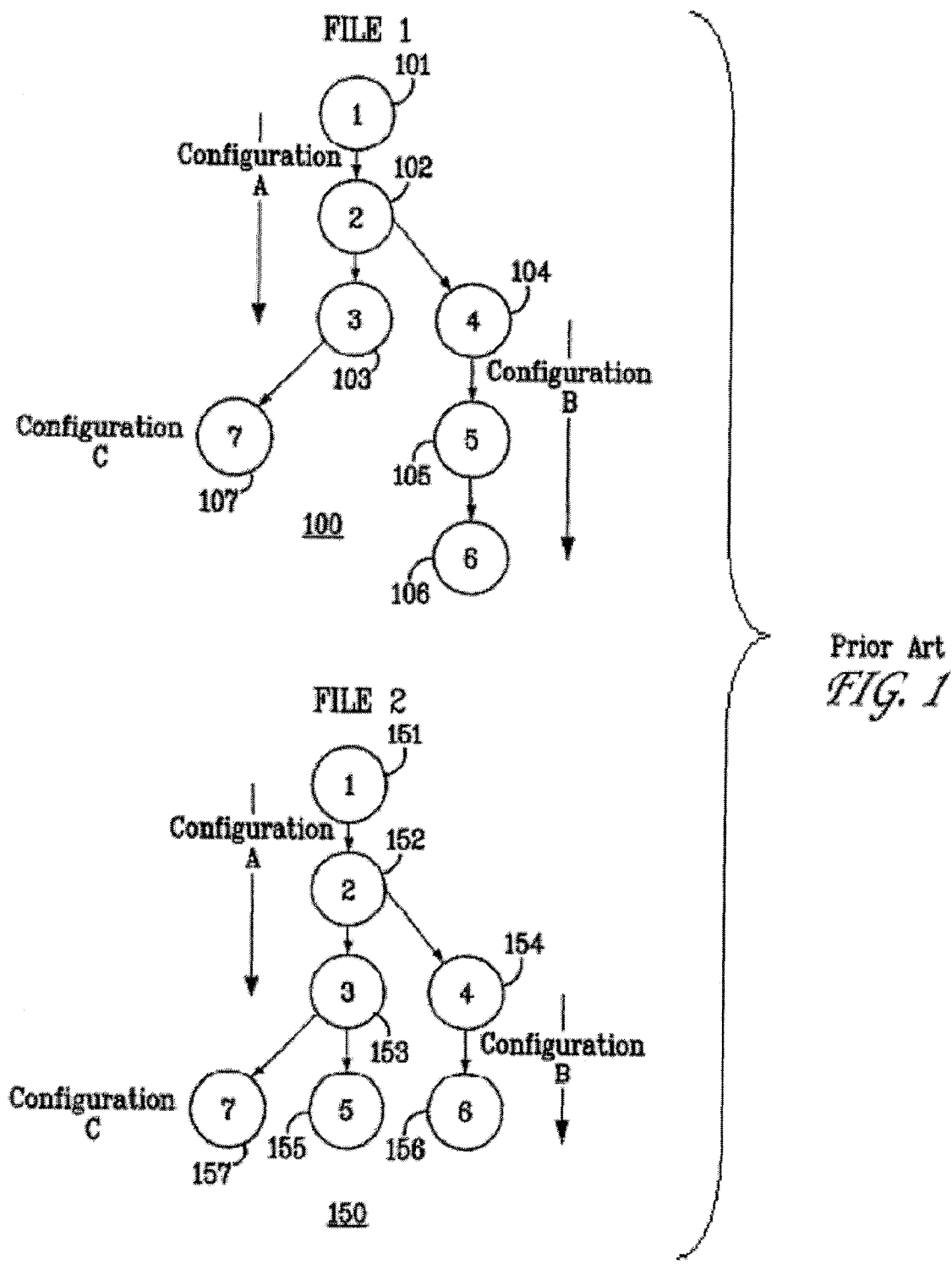
FIG. 1 illustrates an example of version graphs for two files of a multiple file project in accordance with the prior art.

In prior art systems, as illustrated in FIG. 1, if an individual needed to trace the version history for file 1 back to the first version, the system would have to unravel the version graph for file 1 in order to determine the relevant versions. In accordance with the present invention, the determination of relevant versions is simplified because the file version history is linear, and it is maintained across project configurations.

FIGS. 3 and 4 illustrate a conceptual model of one embodiment of the present invention. This model is implemented efficiently by executing software algorithms that will be described in detail below in conjunction with FIGS. 5-31.

Figure 5:
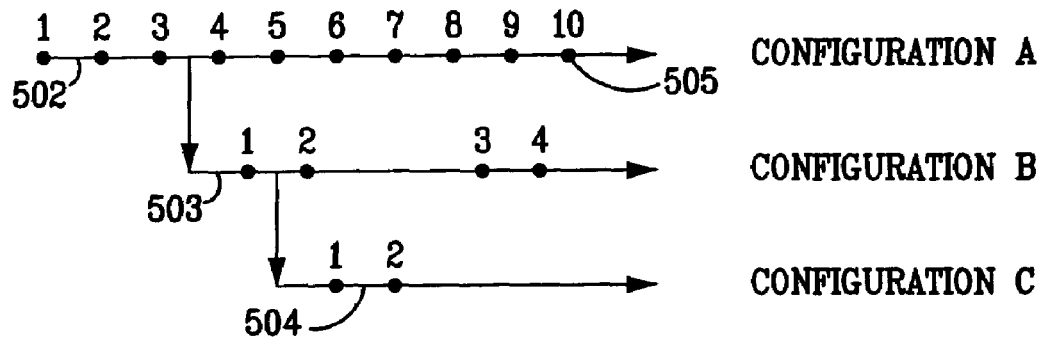
FIG. 5 illustrates an example of a sequence of changes to a project across multiple configurations.

FIG. 5 illustrates an example of a sequence of changes to a project across multiple configurations. The figure depicts change history lines 502, 503 and 504 for three configurations, A, B, and C, of a particular project.

The nomenclature used in FIG. 5 is different from that used in FIGS. 1, 3 and 4. Specifically, each of the nodes 506 along history lines 502-504 is intended to indicate some change to a file within a configuration of the project. The changes could correspond to changes made within different files, or one or more of the changes could correspond to the same file. For example, changes 1-3, 5, and 7-10 along history line 502 could be changes to file 1 of Configuration A, and changes 4 and 6 could be changes to file 2 of Configuration A.

Each change could be a change to a file's contents, properties, name, or location, for example. In general, each change corresponds to a new version of the corresponding file, although this may not always be the case as will be discussed in conjunction with FIGS. 12, 14, and 15. Thus, the change sequence numbers shown in FIG. 5 are potentially different from the version numbers shown in FIG. 4.

The system uses an ordering semantic to indicate the sequence of changes along each configuration's history line. In the embodiment illustrated in FIG. 5, the ordering semantic used is a sequence of ascending integer numbers. The ordering semantic may use different markers to indicate the sequence of changes. For example, the ordering semantic could use a different type of numbering system, a date/time stamp, alphanumeric characters, or any other indicator that can be used to differentiate changes within a sequence. In one embodiment, changes to the store are transactional across multiple modifications. As a result, a date/time stamp can be assigned at the moment the transaction is committed.

A temporal marker, which is consistent with the ordering semantic, is associated with each change. Thus, along line 502, temporal markers that are integer numbers from 1 to 10 are used to distinguish each of the ten changes shown along line 502, and also to give an indication of the sequence in which those changes were made.

As indicated in FIG. 5, Configuration B, whose history is indicated along line 503, is derived from Configuration A. In other words, prior to the first change in Configuration B, Configuration B represented a copy of Configuration A after the third change had been made to Configuration A. Thereafter, four changes were made to Configuration B.

Line 504 indicates a history line for a third configuration, Configuration C. Line 504 shows that Configuration C is based on Configuration B after the first change was made to Configuration B. Because Configuration B is based on Configuration A, then Configuration C is also based on Configuration A. Thus, Configuration C is based on Configuration B after its first change, and on Configuration A after its first three changes.

History lines 502, 504, and 506 indicate that the project history is spread across the configurations. This history is not copied for each configuration. Instead, the histories of the various configurations are re-used any time a configuration is to be reconstructed, and that configuration is based on other configurations.

FIG. 5 represents a parallel development environment. In one case, Configuration A could represent a "main configuration," which is an official project work area having files that are stored in a shared database. Configurations B and C could represent separate project configurations that individuals independently manipulate and change.

In the context of parallel development, individuals typically create copies, or configurations, of the project on the individuals' own computers, or within workspaces that are distinguishable from the main configuration. As will be described later, each individual may push his or her changes made in the configuration back up into the main configuration. Alternatively, the individual may pull changes made in the main configuration down into the individual's configuration, in one embodiment. One advantage to this embodiment is that the store can create these virtual "copies" without any actual copying happening, ensuring that the system is efficient enough to be practical.

Configuration Management Method Functions

Figure 6:
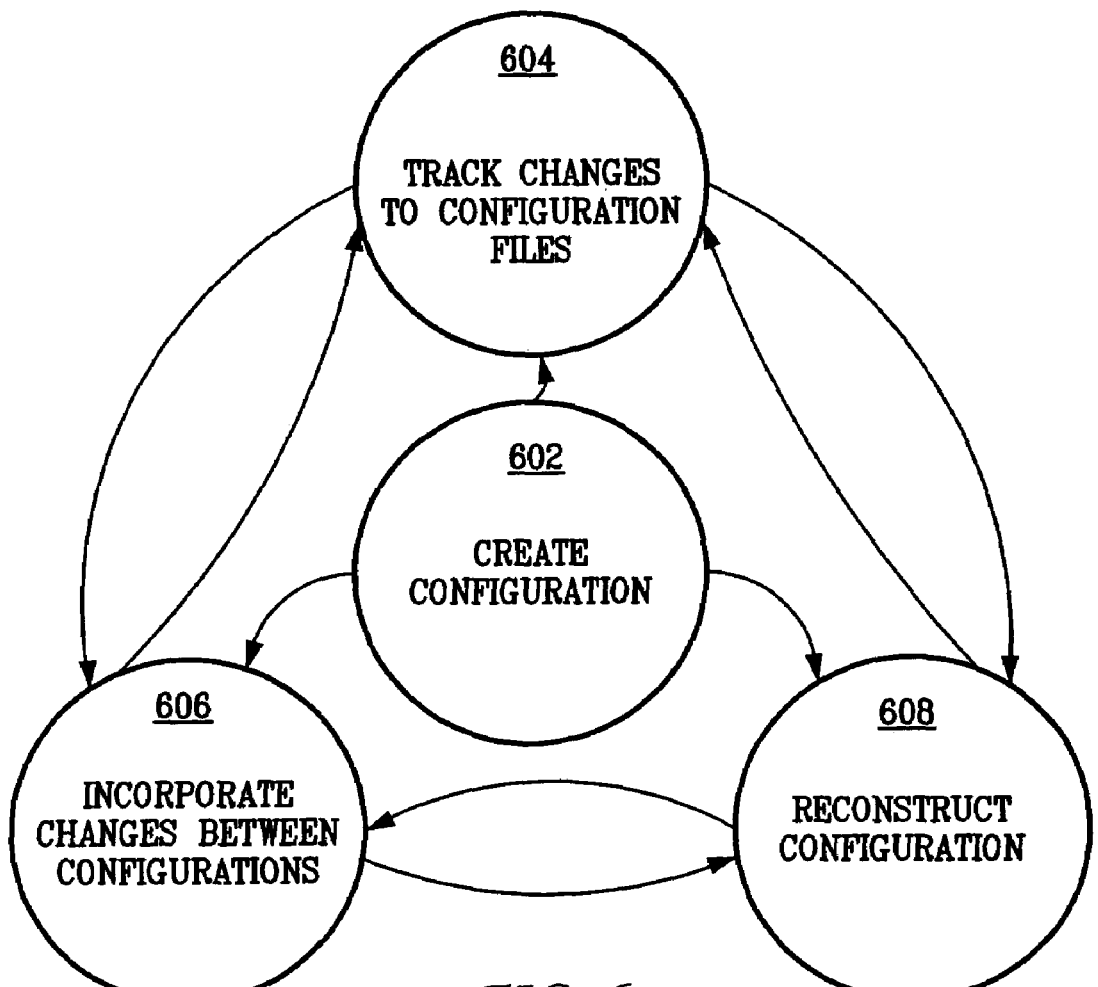
FIG. 6 illustrates a state diagram showing primary functions performed by a configuration management system in accordance with one embodiment of the present invention.

FIG. 6 illustrates a state diagram showing primary functions performed by a configuration management system in accordance with one embodiment of the present invention. Any or all of these functions could be performed for each project configuration. For ease of illustration, however, the functions are described in the context of a single project configuration. The functions described in conjunction with FIG. 6 could simultaneously or sequentially be performed for one or more other configurations.

In one embodiment, the functions shown in FIG. 6 are performed by a computer dedicated to performing configuration management of a particular project. In alternate embodiments, the configuration management functions could be performed by multiple computers.

Each new configuration begins in state 602, in which the configuration management system creates the configuration. Essentially, this involves assigning a unique configuration identifier to the configuration and storing information that describes how that configuration is related to other configurations. Configuration creation is described in more detail in conjunction with FIGS. 7-10.

After the configuration creation state 602, the system could enter any one of states 604, 605, 606, 607 and 608. In state 604, the configuration management system tracks changes made to the configuration's file versions and their associated properties. Essentially, this involves storing information relating to each new version of a file or property in a manner that allows the version or property to be associated with its containing configurations. Tracking changes made to file versions and properties is described in more detail in conjunction with FIGS. 11-15.

An individual who is working on a particular configuration may want to pull changes into his or her configuration, or push changes from his or her configuration into other configurations. This functionality is provided in state 606, where changes are incorporated between configurations.

An individual may want to pull changes into his or her configuration, for example, if a number of changes were made to the main configuration after the individual created his or her configuration from the main configuration. An individual may want to push changes from his or her configuration into the main configuration, for example, if the individual has made some changes to his or her configuration that the individual wants to be incorporated into the main configuration.

In one embodiment, incorporation of changes between files involves updating information that describes the relationships between configurations. Incorporating changes between configurations is described in more detail in conjunction with FIGS. 16-20.

In accordance with the present invention, after a configuration has been created in state 602, the configuration management system is able to reconstruct that configuration at any point along the history line for that configuration. If an individual wants to reconstruct a configuration, state 608 is entered. This process involves evaluating data stored during the processes of creating the configuration, tracking changes to the configuration, and incorporating changes into that configuration. The evaluation yields the identities of the file versions, properties, and property values for the desired configuration at the desired time. Reconstruction of a configuration is described in detail in conjunction with FIGS. 21-29.

Configuration Creation

Figure 7:
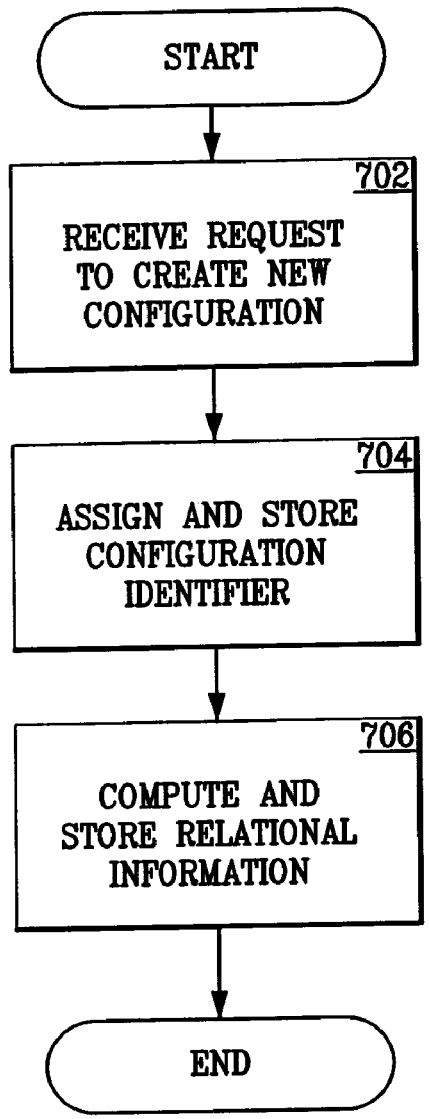
FIG. 7 illustrates a flowchart of a method for creating a new configuration in accordance with one embodiment of the present invention.

FIG. 7 illustrates a flowchart of a method for creating a new configuration in accordance with one embodiment of the present invention. The method begins, in block 702, when a request to create a new configuration is received. The request could be received, for example, from an individual who wants to create and edit a copy of a configuration in his or her own workspace. Alternatively, the request could be received from a project administrator who wants to create an official configuration that will be accessible to multiple individuals. The request may originate from the same computer on which the configuration management software is operating, or it could originate from a remote computer, and be received over a LAN or WAN (e.g., LAN 251 or WAN 252, FIG. 2).

Usually, but not always, each new configuration is based on all or part of an existing, prior configuration. Therefore, in one embodiment, the request to create a new configuration identifies which prior configuration the new configuration is to be based upon. In addition, the request for a new configuration specifies the point, during the history the prior configuration, at which the new configuration should be based. This indication could be a date (e.g., as of Mar. 15, 1999) or it could be a temporal marker along the history line for the prior configuration (e.g., after the third change to the prior configuration). For example, referring to FIG. 5, the request to create Configuration C could have indicated that Configuration C was to be based upon Configuration B after the first change to Configuration B. Before Configuration C was modified, it represented a copy of Configuration B after the first change to Configuration B.

In block 704, a unique configuration identifier is assigned to the new configuration, and that configuration identifier is stored by the system. The unique configuration identifier could be any combination of numbers, letters, or other symbols. For ease of description, the configuration identifier will be an alphabetical character (e.g., "A", "B", "C", etc.).

Along with the configuration identifier, certain relational information is computed and stored in block 706. As described above, each new configuration typically is based on a prior configuration. In turn, the prior configuration may have been based on an earlier prior configuration, and so on. These prior configurations are referred to herein as "related configurations," and the relational information is the precomputed closure.

In order to accurately reconstruct a configuration, as will be described below, information is maintained describing the relationships between the new configuration and its related configurations. This "relational information" indicates which related configurations, if any, the new configuration is based upon. Because each configuration can be changed over time, the relational information also indicates which changes (e.g., which file versions), along the history lines of the related configurations, are incorporated into the new configuration.

As an example, referring to FIG. 5, the relational information for Configuration C would indicate that Configuration C is based upon Configuration B after the first change was made to Configuration B. In addition, the relational information would indicate that Configuration C is also based on Configuration A after the third change was made to Configuration A. Therefore, Configuration C is related to both Configuration B and Configuration A. After computing and storing the relational information, the method ends, and the new configuration is considered to have been created by the system.

Figure 8:
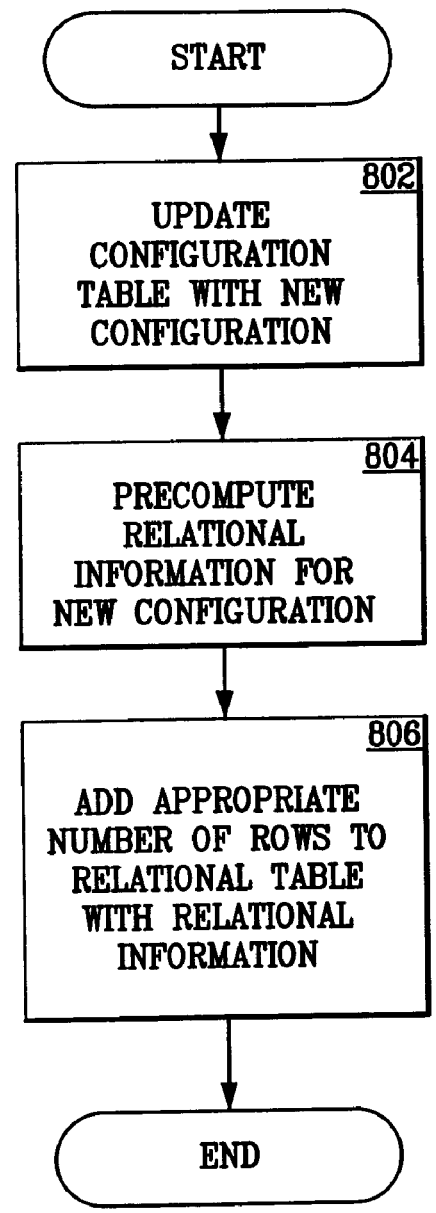
FIG. 8 illustrates a flowchart of a method for storing configuration identifiers and relational information in accordance with one embodiment of the present invention.

FIG. 8 illustrates a flowchart of a method for storing configuration identifiers and relational information in accordance with one embodiment of blocks 704 and 706 (FIG. 7). In this embodiment, the process of assigning and storing a configuration identifier (block 704, FIG. 7) involves updating a "Configuration Table," by creating a new record that includes configuration information for the new configuration. The new information includes the configuration's name, a unique configuration identifier, and, possibly, some general information concerning the configuration (e.g., configuration properties).

The Configuration Table is accessed any time it is necessary to determine the unique configuration identifier from the name of the configuration, or vice versa. For example, as will be described more fully below, a request to reconstruct a configuration may specify the configuration name (e.g., "Configuration C"). The system would then access the Configuration Table to determine the unique configuration ID, which is then used to reconstruct the configuration.

FIG. 9 illustrates an example of a Configuration Table in accordance with the method illustrated in FIG. 8. Configuration Table 900 includes fields for the configuration name 902, the configuration identifier (ID) 904, and other information 906 (e.g., properties or other general information) associated with the configuration. As an example, referring to FIG. 5, when Configuration C was newly created, a new record, entry 908, was added to the Configuration Table in block 802 (FIG. 8). The record specified "Config C" as the configuration name in field 902, "C" as the configuration identifier in field 904, and any other information associated with Configuration C in field 906. In alternate embodiments, different types of configuration identifiers could be used (e.g., numbers and/or other symbols), and the Configuration Table could have more, fewer or different fields.

The process of computing and storing relational information (block 706, FIG. 7) is performed by blocks 804 and 806, in one embodiment. In block 804, relational information for the new configuration is precomputed, meaning that the information is computed in anticipation of reconstructing the configuration in the future. Use of the relational information to reconstruct the configuration is described in more detail in conjunction with FIGS. 21 and 22.

For now, only the initial computation and storing of the relational information is described. The relational information includes several different types of information. First, the relational information includes information that describes the relationship between the new configuration and one or more prior, related configurations upon which the new configuration is based. In addition, the relational information includes information describing what changes, along the history lines of each related configuration, are incorporated into the new configuration. Finally, the relational information includes information describing which changes, along the history line of the new configuration, are to be associated with the new configuration.

Referring again to FIG. 5, the relational information for Configuration C would indicate that Configuration C includes:

all changes to Configuration C from temporal marker 0 to infinity, all changes to Configuration B from temporal marker 0 to 1; and all changes to Configuration A from temporal marker 0 to 3.

FIG. 10 illustrates an example of a Relational Table 1000 in accordance with the method illustrated in FIG. 8. Relational Table 1000 includes fields for configuration ID 1002, lower limit 1004, upper limit 1006, and relational information 1008.

Configuration ID field 1002 includes the identities of the configurations for which the relational information is stored. Thus, record 1010 includes relational information for Configuration A, records 1011 and 1012 include relational information for Configuration B, and records 1013, 1014 and 1015 include relational information for Configuration C.

Lower limit field 1004 and upper limit field 1006 indicate the temporal markers, along the configuration's history line, that the relational information in that record pertains to. Thus, the relational information stored in record 1010 is applicable whenever Configuration A is to be reconstructed at any historical point from its zeroth temporal marker to infinity.

In one embodiment, for each configuration ID, a record is included in Relational Table 1000 for the identified configuration and for each related configuration. These records enable later reconstruction of any configuration at any point along its temporal history line. Thus, for Configuration C, three records 1013-1015 are included in Relational Table 1000.

The first record 1013 includes, in relational information field 1008, information indicating which changes (as identified by temporal markers) to Configuration C are to be associated with Configuration C. In the example illustrated in FIG. 5, all changes to Configuration C from temporal markers 0 to infinity are to be included. This is indicated in relational information field 1008 by the semantic: "C from 0→infinity". The next record 1014 includes, in relational information field 1008, information indicating which changes to Configuration B are to be associated with Configuration C. Referring to FIG. 5, all changes to Configuration B from temporal markers 0 to 1 are to be included, as indicated by the semantic: "B from 0→1". Finally, the next record 1015 includes, in relational information field 1008, information indicated which changes to Configuration A are to be associated with Configuration C. Referring to FIG. 5, all changes to Configuration A from temporal markers 0 to 3 are to be included, as indicated by the semantic: "A from 0→3". Thus, relational information field 1008 includes the pre-computed closure, which indicates which changes from each configuration apply to any particular configuration. In an alternate embodiment, a single record could include the relational information for each configuration ID.

As will be described in more detail below in conjunction with FIGS. 21 and 22, the stored relational information enables any prior version of a configuration to be reconstructed. For example, if an individual wanted to reconstruct Configuration B as of the first change, the system would obtain the relational information from records 1011 and 1012 of the Relational Table 1000. Record 1011 indicates that the system should first look at file versions associated with changes made in Configuration B. If those file versions do not include all files necessary to reconstruct the configuration, then record 1012 indicates that the system should look at file versions associated with changes made to Configuration A from temporal markers 0 to 3.

Referring back to FIG. 8, after the relational information is precomputed, the appropriate number of rows are added, in block 806, to the Relational Table (1000, FIG. 10) with the precomputed relational information. For example, as indicated above, when Configuration C was created, three records (1013-1015, FIG. 10) were added to the Relational Table. Once the relational information has been stored, the method ends.

By precomputing and storing the relational information, the method of the present invention achieves the significant advantages over prior art methods. Specifically, the information can be used, in the future, to recreate any configuration at any point along the configuration's history line. Rather than storing full content versions of each configuration as is done in prior art methods, the method of the present invention needs only to store the relational information and a copy of each version of a file.

The process of creating each configuration distinguishes the method and apparatus of the present invention over the prior art by creating a "space" in which each configuration can be developed. In other words, once the configuration is created, information regarding file versions that form a part of that configuration can be stored in a manner that enables those versions easily to be associated with the configuration.

Tracking Changes

Besides storing the relational information, information describing changes to the files within each configuration is also tracked and stored in one embodiment. FIGS. 11-15 illustrate methods for tracking changes to files within a configuration (state 604, FIG. 6) in accordance with embodiments of the present invention.

Tracking changes to a configuration's files is particularly important in the context of parallel development, where individuals make changes within multiple configurations concurrently. The method of tracking changes in accordance with the present invention operates on configurations that are recognized by the configuration management system, meaning that the configurations were previously created by the system as described in conjunction with FIGS. 7-10.

Figure 11:
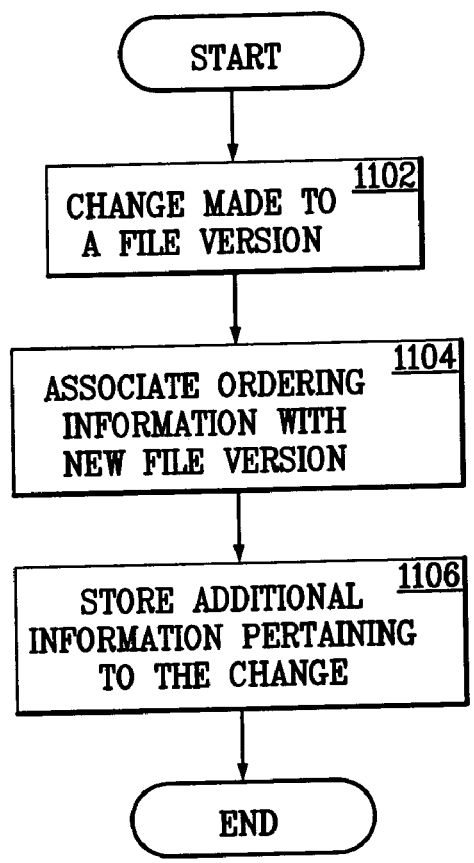
FIG. 11 illustrates a flowchart of a method for tracking changes to files of a configuration in accordance with one embodiment of the present invention.

FIG. 11 illustrates a flowchart of a method for tracking changes to files of a configuration in accordance with one embodiment of the present invention. The method begins, in block 1102, when the individual has changed a version of a file that is associated with a particular containing configuration. The system is apprised of the change when the individual attempts to save or check in a new version of a file into the containing configuration.

Many different types of changes could be made to the files of a configuration, depending on the types of files that comprise the configuration. For example, if a file is a source code file, then the individual may change one or more lines of code within the file. Alternatively, if the file is a spreadsheet, the individual may modify certain data within the spreadsheet, or change the format of the spreadsheet. Besides content changes, changes to a file could also be changes to the file's properties, name, or location, for example. For example, a file could be renamed from "one" to "uno," or the file could be moved from one directory or drive to another.

In block 1104, information is stored that associates the change with some ordering information (e.g., a temporal marker or a date/time stamp). The ordering information indicates the order of the change along the history line of the configuration. For example, this information could indicate that the change to the file was the tenth change to any file during the life of the configuration. Alternatively, the information could indicate that the change was made at a specific time and/or date.

In block 1106, additional information pertaining to the change is stored. For example, if the change is a change to a file's content, name, or location, information indicating which configuration the change is to be associated with is stored along with the change information. If the change is to a file's properties, information indicating which file the change is associated with is stored. After storing the additional information, the method ends.

Figure 12:
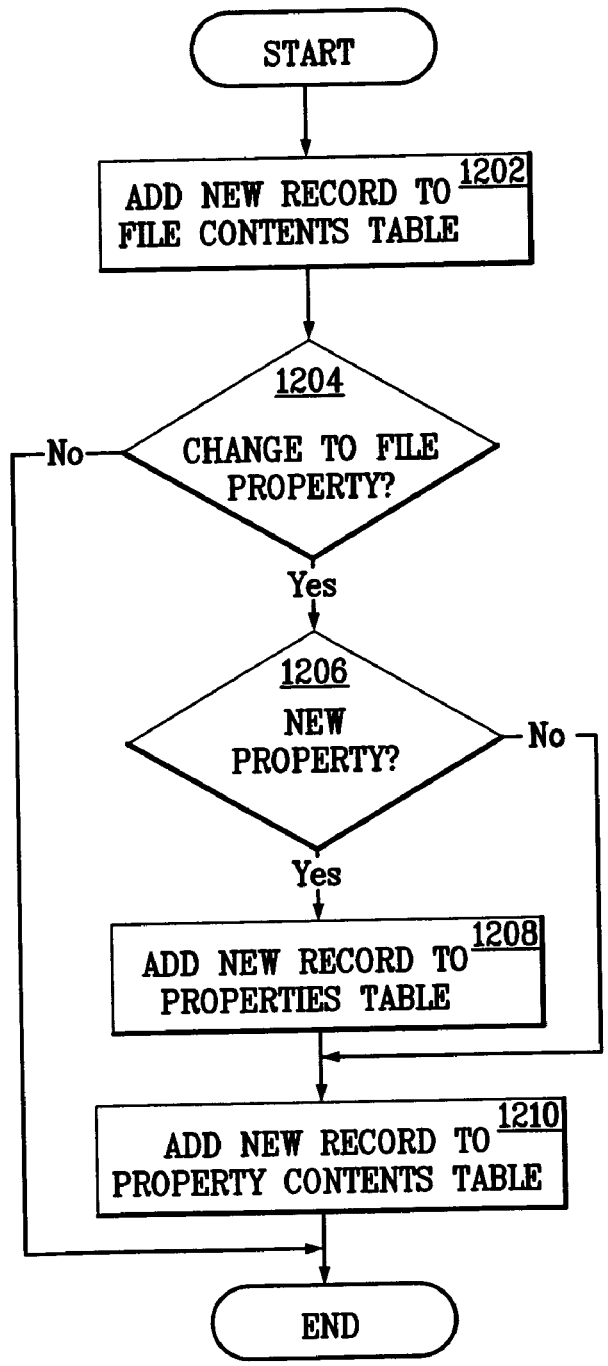
FIG. 12 illustrates a flowchart of a method for storing information associating a change with ordering information in accordance with one embodiment of the present invention.

FIG. 12 illustrates a flowchart of a method for storing information associated with a change (block 1106, FIG. 11) in accordance with one embodiment of the present invention. In one embodiment, this information is stored in any of several tables maintained by the system. Change information for changes to a file's content, name or location is stored in a "File Contents Table," which includes information pertaining to every version of every file within the various configurations of the project. An example of a File Contents Table is described below in conjunction with FIG. 13. A list of properties associated with the project files is stored in a "Properties Table," described below in conjunction with FIG. 14. Finally, change information for changes to a file's properties is stored in a "Property Contents Table," described below in conjunction with FIG. 15.

FIG. 13 illustrates an example of a File Contents Table in accordance with one embodiment of the method illustrated in FIG. 12. File Contents Table 1300 includes fields for the filename/path 1302, moved to 1303, moved from 1304, file ID 1305, version number 1306, version ID 1307, temporal marker 1308, date/time stamp 1310, and the configuration ID 1312.

In the example shown, File Contents Table 1300 includes data that tracks changes to versions of two files, initially named "one.doc" and "two.doc." The first two entries 1320, 1321 represent the first versions of the files.

Each entry in filename/path field 1302 includes the name of the file whose change information is stored in the corresponding record, along with the drive and directory under which that file is stored. Thus, the first versions of files named "one.doc" and "two.doc" are stored on the C: drive in the "DIR" directory. Storing the path with the filename enables an entire directory tree to be reconstructed once the versions pertaining to a particular configuration have been identified.

In one embodiment, the moved to 1303 and moved from 1304 fields indicate that a particular file has either been moved or has undergone a namespace change somewhere along its history. These fields 1303, 1304 allows the history of a file to be easily traced when dealing with folder movement and name changes. In another embodiment, these fields 1303, 1304 are not included.

In one embodiment, a unique "file ID" is assigned to each file within the project. The file ID for each file version is shown in file ID field 1305. The file ID is, essentially, a "hidden" name for the file, which has a fixed value throughout the life of the file. The file ID could be a number, a name, or any other type of indicator that is able to uniquely identify a file. As exemplified in file ID field 1305, the file ID for the file named "one.doc" is "123," and the file ID for the file named "two.doc" is "345."

The main function of the file ID is to enable a previous version of a configuration to be reconstructed even when one or more files was later moved or renamed. As described previously, in some prior art systems, the filename is the primary way of identifying a file. Therefore, if a file is renamed or moved, it is recognized in prior art systems as a new file. In such systems, it is not possible to trace back to earlier versions of the file that may have a different name or location. In other words, the history line for the file is not maintained by prior art systems, so those prior art systems are not able to locate previous versions of the file.

The method and apparatus of the present invention overcomes this problem by utilizing the unique file ID for each file, along with the moved to 1303 and moved from 1304 fields. Regardless of whether the name or location of a file has been changed, the system is able to trace back to prior versions of a file using the unique file ID for that file. Thus, in accordance with the present invention, the project namespace is versioned along with the files. This enables an individual to reconstruct the namespace of any prior configuration, including all filename and path information.

The unique file ID also is useful where multiple project files have the same name, but are located in different directories. By assigning a unique file ID to each file within the project, confusion surrounding same-named files is avoided.

Referring back to FIG. 13, entry 1326 indicates that file "one.doc" has been moved from the "DIR" directory to the "OTHER" directory. Also, entry 1330 indicates that the file "two.doc" was renamed "dos.doc." Regardless of these namespace changes, the method and apparatus of the present invention will be able to trace back to prior versions of files "one.doc" and "two.doc" by referring to their unique file IDs. The moved to 1303 and moved from 1304 fields enable the history to be traced even more readily.

Each entry in version number field 1306 indicates the version number for the file identified in filename/path field 1302. Thus, entry 1320 corresponds to the first version of the file named "one.doc," and entry 1321 corresponds to the first version of the file named "two.doc." In addition, version ID field 1307 includes a unique ID number for each version. The unique version ID is useful for tracking merge changes and also for tracking properties, as is described below.

Temporal marker field 1308 includes entries that indicate where a change has occurred in the sequence of changes made within a configuration, and configuration ID field 1312 indicates in which containing configuration the change was made. The temporal markers are used to sequence changes made in each configuration. In the embodiment shown in FIG. 13, the temporal markers are a series of ascending integer numbers, starting at the value of 1. In other embodiments, the initial temporal marker for a configuration could start at a different value from 1, could increase by values of more than 1 for each subsequent change, or could be a sequential representation other than a number. Regardless of its form, the temporal markers enable the changes within each configuration to be sequentially ordered.

Entry 1322 corresponds to the first change made in Configuration A, which change happens to be a change to the file named "one.doc." Entry 1337 corresponds to the tenth change made in Configuration A, which change happens to be a change to the file named "dos.doc" (formerly named "two.doc"). With respect to Configuration B, entry 1326 corresponds to the first change made in Configuration B, and entry 1329 corresponds to the second change made in Configuration B.

Finally, date/time field 1310 includes a date/time stamp (or simply a date stamp) that indicates when the new file version corresponding to the record was checked into the system. In one embodiment, the temporal marker and the date/time stamp are separate identifiers. In an alternate embodiment, the temporal marker could be a date/time stamp, making a separate date/time field unnecessary.

Referring back to FIG. 12, when a change has been made to a configuration, a new record is added to the File Contents Table (e.g., Table 1300, FIG. 13), in block 1202, and the fields of the new record are filled in to include the information pertaining to the new file version. Thus, as an example, if an eleventh change was made to Configuration A, a new row would be added after entry 1337 in FIG. 13, and all fields of the row would be filled in with the file version information.

A determination is made, in block 1204, whether the change includes a change to one or more of the file's properties, where each property is defined by a property name and its associated value. Thus, a change could be made to the property name or its value. A property can be, for example, metadata associated with the file (i.e., information about the file, such as the file header, permissions, access and security options, date/time, etc.). Properties may also be associated with file content, as well. Any number of properties could be associated with a particular file version.

If no change is made to a file's properties, the method ends. If a change is made to the file's properties, then a determination is made, in block 1206, whether the property change is an addition of a new property. If the change includes an addition of a new property, then a new record is added to a Properties Table, in block 1208, with the name of the new property and a unique property ID for the new property.

FIG. 14 illustrates an example of a Properties Table in accordance with one embodiment of the method illustrated in FIG. 12. In one embodiment, Properties Table 1400 includes fields for property name 1402 and property ID 1404.

Each entry in property name field 1402 includes the name of the property whose unique property ID is stored in the corresponding property ID field 1404. In the example shown, Properties Table 1400 includes three properties, named "PROP1," "PROP2," and "PROP3," having unique property IDs of "111," "222," and "333," respectively.

The concept of using a unique property ID is similar to the concept of using a unique file ID to ensure that the system can track the history of a file even when the file has been moved or renamed. With respect to the property ID, even if the name of a property changes, the system will be able to track the history of the property using the property ID. In addition, multiple files might use the same property name to identify a property associated with those files, even though the same-named properties may serve different purposes and have different values. By assigning a unique property ID to each property within the project, confusion surrounding same-named properties is avoided. The Properties Table is accessed when it is necessary to determine the unique property ID from the name of a property, and vice versa.

Referring back to FIG. 12, after the new property record is created, or if a determination was made in block 1206 that the changed property is an existing property, one or more records are added to a "Property Contents Table" with the new or modified property information in block 1210. The Property Contents Table includes one or more records for each property associated with the project's files.

FIG. 15 illustrates an example of a Property Contents Table in accordance with one embodiment of the method illustrated in FIG. 12. In one embodiment, Property Contents Table 1500 includes fields for property ID 1502, property value 1504, file ID 1506, version ID 1507, configuration ID 1508, temporal marker 1510, and date/time 1512.

In the example shown, Property Contents Table 1500 includes data that tracks changes to the properties named "PROP1," "PROP2," and "PROP3" that were described in conjunction with FIG. 14. The first three records 1521, 1522, and 1523 include initial values for these properties. The next records 1524 and 1525 show changes to two of the property values.

Each entry in property ID field 1502 includes the unique property ID for the property whose change information is stored in the corresponding record. The property value field 1504 stores the value for that version of the property. For example, record 1524 shows that the property having property ID "111" changed to a value of "7" from its original value of "0" in record 1521.

When the system is asked to determine which properties are associated with which of a configuration's files, the system joins the Property Contents Table 1500 with the File Contents Table (FIG. 13) based on any or all of fields 1506, 1507, 1508, and 1510. The file ID field 1506 stores the unique file ID corresponding to the property identified in the property ID field 1502. Thus, for example, record 1522 indicates that the property having property ID "222" is associated with a file having file ID "123." In addition, version ID field 1507 stores the unique version ID for the particular file version. Finally, the configuration ID field 1508 stores the configuration ID corresponding to the configuration with which the file version is associated.

Temporal marker field 1510 includes entries that indicate where the change to the property has occurred in the sequence of changes made within a particular configuration. Note that the first three entries, 1521-1523, have temporal marker values of zero. This indicates that these entries correspond to the original values of the properties.

Finally, date/time field 1512 includes a date/time stamp (or simply a date stamp) that indicates when the property was created, or when the value for the property was changed. In one embodiment, the temporal marker and the date/time stamp are separate identifiers. In an alternate embodiment, the temporal marker could be a time/date stamp, making a separate date/time field unnecessary.

Several types of properties are managed by the system in one embodiment. An individual specifies what type of property is being created or changed, and, as described below, that type governs how the system tracks the new or modified property. The first type of property is an "immutable" property, which means that if the property value is changed, a new version of the corresponding file results. Thus, when an immutable property value is changed, a new file version is added to the File Contents Table with a new temporal marker. A new record is also added to the Property Contents Table with the new value for the property and the new temporal marker.

The second type of property is a "mutable" property, which can be changed at any time without causing a new file version to be created. When a mutable property is created, an entry is added to the Property Contents Table, but not to the File Contents Table.

Two types of mutable properties exist: "version-specific" mutable properties and "document" mutable properties. A version-specific mutable property is a property that applies a new value for the property only to a particular version. When a version-specific mutable property is created, a record is added to the Property Contents Table that associates the property only with the particular version of the corresponding file, and gives the property a new temporal marker.

A document mutable property is a property that applies a new value for the property to all versions of the file. When a document mutable property is created for a file, it is given a temporal marker value of 0, which means that every file version of the file will include the version mutable property. In addition, if the value of a version mutable property is changed, no new entry is added to the Property Contents Table. Instead, only a single entry ever exists for a version mutable property.

A third type of property is a "historical" property. A historical property is a version-specific mutable property for which a record of all previous values of the property is maintained. Instead of overwriting the value of a historical property in the Property Contents Table, a new record for the property is added to the Property Contents Table, and the old values are retained. This enables the history of the property to be accessed, if desired. One feature of historical properties is that a history graph of these types of properties is orthogonal to the history of the object that has the property.

Referring again to FIG. 15, version mutable properties are fetched using the version ID 1507, whereas document mutable properties are fetched using the file ID 1506. Thus, storing both the file ID 1506 and the version ID 1507 allows the system to maintain a generic versioned property store, since properties for previous file versions are keyed off an ID. In other words, the properties can be fetched using the file ID or the version ID.

Referring back to FIG. 12, after the information describing changes to the files and/or properties has been added to the system, the method ends.

Tracking changes, as described in the flowcharts of FIGS. 11 and 12, is a process that occurs continuously during the project development cycle. Ideally, the process begins at the inception of the project, and does not end until the project is completed.

The purpose for tracking changes is to enable the creation of a new configuration or the recreation of any version of a prior configuration. In accordance with one embodiment, creation or recreation of a version of a configuration utilizes the File Contents Table, Properties Table, Property Contents Table, and other tables, as will be described below in conjunction with FIGS. 21-29.

One advantage to the method of the present invention is that it uses relatively small amounts of memory and/or disk space in providing a configuration management system. By pre-computing the relational information (block 804, FIG. 8) that describes the relationships between various configurations, and associating configuration information (field 1312, FIG. 13) with file version information (fields 1302-1310, FIG. 13), a configuration can be reconstructed by reusing the file version information from previous, related configurations. In other words, it is not necessary to duplicate the file version information for every configuration. Instead, if an individual wants to recreate Configuration C, for example, the system will re-use file version information associated with Configurations A and B, upon which Configuration C is based. Thus, one characteristic of the present invention is that copying of file version information is avoided.

This is also true for property information. By pre-computing the relational information, and storing the file version and property information (FIG. 15) as described above, the property information also does not need to be copied for each configuration. Instead, the system creates a new configuration by re-using property information from previous configurations upon which the new configuration is based.

Incorporating Changes Between Configurations

As described previously, each configuration is a separate copy of the project that can be independently manipulated, and each configuration exists in a workspace that is separate from other configurations. The workspace need not be physically separate, but is logically separate.

At times, an individual may wish to push changes he or she made to the individual's configuration into another configuration, or to pull changes made to another configuration into the individual's configuration. FIGS. 16-20 illustrate a method for incorporating changes between configurations (state 606, FIG. 6) in accordance with embodiments of the present invention.

Figure 16:
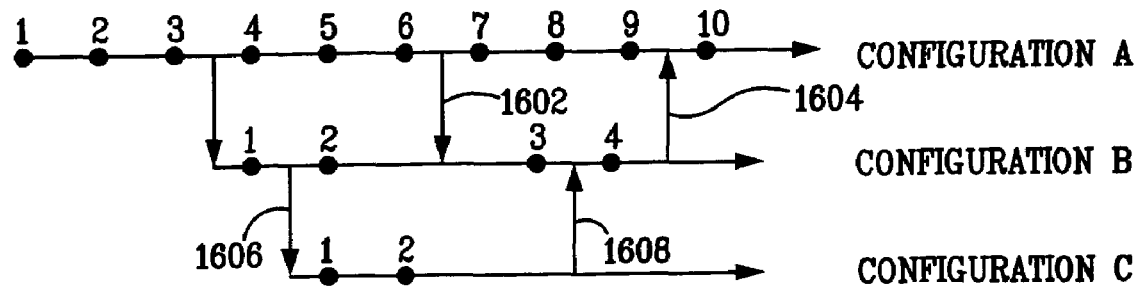
FIG. 16 illustrates a second example of a sequence of changes to a project across multiple configurations.

For purposes of illustration, FIG. 16 illustrates the same change history lines as were depicted in FIG. 5, except that changes 4 through 6 of Configuration A are being pulled into Configuration B after the first two changes have been made to Configuration B. This is indicated by arrow 1602. This process of pulling changes into a second configuration from a first configuration upon which the second configuration is based is referred to as "resynchronizing" the second configuration with the first configuration. FIG. 16 also illustrates, via arrow 1604, changes being pushed from Configuration B into Configuration A after the fourth change was made to Configuration B.

In various embodiments, the method and apparatus of the present invention is capable of incorporating changes from a first configuration into a second configuration, either by pulling changes to the first configuration into the second configuration or by pushing changes from the second configuration into the first configuration. Essentially, this involves modifying the relational information for the configuration that is receiving the changes.

Figure 17:
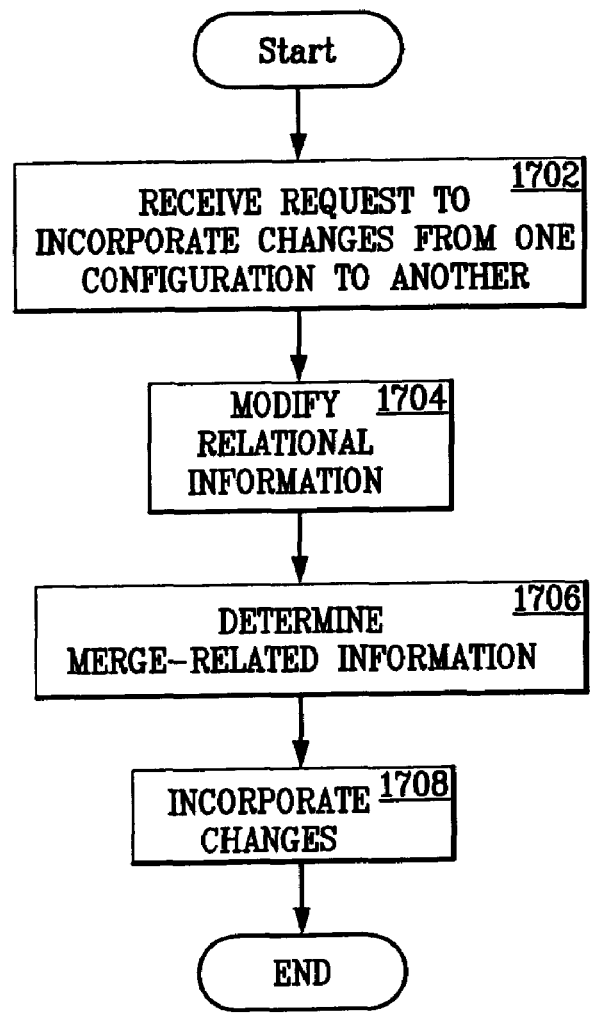
FIG. 17 illustrates a flowchart of a method for incorporating changes made in one configuration into another configuration in accordance with one embodiment of the present invention.

FIG. 17 illustrates a flowchart of a method for incorporating changes made in one configuration into another configuration in accordance with one embodiment of the present invention. The method begins, in block 1702, when a request is received to incorporate changes from one configuration to another. For example, referring to FIG. 16, a request issued after the second change to Configuration B would specify that all changes made to Configuration A since the creation of Configuration B should be pulled into Configuration B, as indicated by arrow 1602. In addition, a request issued after the fourth change to Configuration B would specify that all changes made to Configuration B should be pushed into Configuration A, as indicated by arrow 1604.

As described above in conjunction with FIG. 7, when a configuration is created, certain relational information is stored (block 706), which describes the relationships between the new configuration and other related configurations. The relational information indicates which related configurations, if any, the new configuration is based upon, and also which changes, along the history lines of the related configurations, are incorporated into the new configuration.

When changes are pulled or pushed into a configuration, the relationships between configurations change. Referring back to FIG. 17, because the relationships between configurations change, the relational information for the configuration receiving the changes is modified in block 1704.

For example, FIG. 16 indicates that Configuration B was originally based on Configuration A after the first three changes had been made to Configuration A. When Configuration B is resynchronized with Configuration A, as indicated by arrow 1602, the relational information for Configuration B is modified to reflect the fact that now changes 1-6 in Configuration A are incorporated into Configuration B. As indicated by arrow 1604, when changes are pushed from Configuration B into Configuration A after changes 1-4 were made to Configuration B, the relational information for Configuration A is modified to reflect the fact that changes 1-4 in Configuration B should be incorporated into Configuration A.

As described above in conjunction with FIGS. 8 and 10, when a new configuration is created, relational information is precomputed (block 804) and stored in a Relational Table (FIG. 10). The relational information includes: information that describes the relationship between the new configuration and one or more prior configurations upon which the new configuration is based; information describing which changes, along the history lines of each related configuration, are incorporated in to the new configuration; and information describing which changes, along the history line of the new configuration, are to be associated with the new configuration.

Within the Relational Table, a lower limit field 1004 and upper limit field 1006 indicate the temporal markers, along the configuration's history line, that the relational information in that record pertains to. Thus, FIG. 10 indicates that the relational information stored in record 1010 should be used whenever Configuration A is to be reconstructed at any historical point from the first temporal marker to infinity. In accordance with one embodiment, these values are updated when changes are pushed or pulled from one configuration to another.

Figure 18:
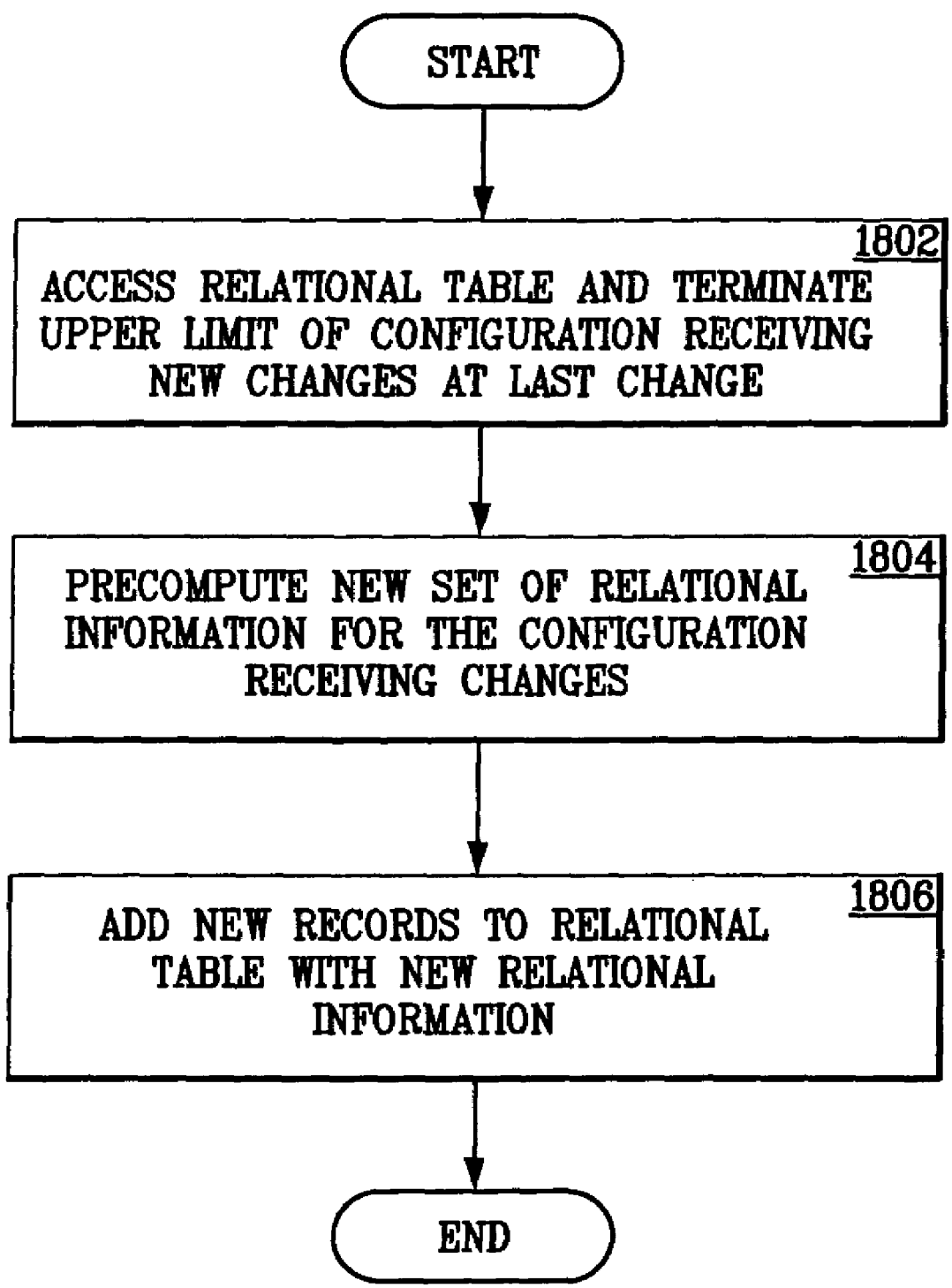
FIG. 18 illustrates a flowchart of a method for modifying relational information in accordance with one embodiment of the present invention.

FIG. 18 illustrates a flowchart of a method for modifying relational information (block 1704, FIG. 17) in accordance with one embodiment of the present invention. The method begins, in block 1802, by accessing the Relational Table (e.g., Table 1000, FIG. 10), and terminating the upper limit of the configuration receiving the changes at the last change made to the configuration. In other words, referring to FIG. 16, when changes are pulled from Configuration A into Configuration B, as indicated by arrow 1602, the upper limit of Configuration B is terminated at the second change to Configuration B.

This concept is illustrated in FIG. 19, which shows a second example of a Relational Table 1900. Comparing Relational Table 1800 with Relational Table 1000 (FIG. 10), it is apparent that the upper limit entries for records 1011 and 1012 have changed from infinity to "2". This means that, if someone later wants to reconstruct Configuration B as of the first or second change to Configuration B, the relational information would be found in records 1011 and 1012. If someone later wants to reconstruct Configuration B from the third change onward, the relational information would be found in records 1910-1913.

Because of the change to the Relational Table, the relational information for Configuration B now is valid only up through the second change to Configuration B. Referring again to FIG. 18, a new set of relational information is pre-computed, in block 1804, for Configuration B beyond the second change. This new relational information is necessary because once the additional changes to Configuration A are pulled into Configuration B, as indicated by arrow 1602 (FIG. 16), Configuration B is based on Configuration A through its sixth change. The new set of relational information is valid for Configuration B after the second change to Configuration B.

In block 1806, an appropriate number of new records are added to the Relational Table with the new set of relational information. The addition of new records is illustrated in FIG. 19, where records 1910 and 1911 were added to include the new relational information for Configuration B. The lower and upper limit fields 1004, 1006 for the new records 1910, 1911, 1912, and 1913 indicate that the relational information is valid from the third change to Configuration B through infinity.

In one embodiment, in order to make the relational information as impervious as possible to other interrelated changes, the relational information "weaves together" the sequences of changes to the related configurations. Thus, the relational information in records 1910-1913 indicates that Configuration B, from its third change onward, includes:

all changes to Configuration B from its third change through infinity, as indicated in relational information field 1008 by the semantic: "B from 3→infinity," in record 1910;

all changes to Configuration A from its fourth change through its sixth change, as indicated in relational information field 1008 by the semantic: "A from 0→6," in record 1911;

the first and second changes to Configuration B, as indicated in relational information field 1008 by the semantic: "B from 1→2," in record 1912; and the first through the third changes to Configuration A, as indicated in relational information field 1008 by the semantic: "A from 1→3," in record 1913.

Thus, if someone later wants to reconstruct Configuration B as of the third or a later change to Configuration B, the relational information would be found in records 1910, 1911, 1912, and 1913. The file versions identified in these records would be appropriately arranged, taking into account that a resynchronization process had occurred (i.e., that changes made in Configuration A were pulled into Configuration B). The arrangement process could be performed in several ways, as would be obvious to one of skill in the art based on the description herein.

In order to push changes from one configuration into another, as indicated by arrow 1604 (FIG. 16), the same process would be followed. Thus, in the example illustrated in FIGS. 16 and 19, the upper limit for Configuration A in record 1010 (FIG. 19) would be changed to "9", and records would be added to the Relational Table including a new set of relational information for Configuration A. These new records would indicate that Configuration A, from its tenth change onward, would be based on Configuration A from its tenth change to infinity, Configuration B from its third through its fourth change; Configuration C from its first through its second change; Configuration A from its seventh through its ninth change; Configuration B from its first through its second change; Configuration A from its fourth through its sixth change; and Configuration A from its first through its third change.

The number of records added to the Relational Table depends on the number of configuration sections upon which a modified configuration is based. In one embodiment, one record is added for the configuration itself, and one record is added for each section of a related configuration upon which it is based. As previously mentioned, relational information for any particular configuration could be consolidated into fewer records. After adding the appropriate number of records to the Relational Table in block 1806, the method illustrated in FIG. 18 ends.

Referring back to FIG. 17, once the relational information is modified in block 1704, the system determines any relevant merge-related information in block 1706. As is described in, detail below, merge-related information is information used by the system to accurately merge files from one configuration into another.

During the process of incorporating changes into a first configuration, the system may encounter conflicts between changes that have been made to a file in a second configuration and changes that have been made to the file in the first configuration. These conflicts, are generally resolved using a merge process, which is fairly straightforward when the files being merged have the same file ID in accordance with the present invention.

In some cases, however, an individual may have pulled a file from a first configuration into his or her configuration, but assigned a new file ID to the file. The individual may then modify the file, and try to push the file changes back into the first configuration. For example, referring to FIG. 16, assume that changes 2 and 3 in Configuration B are changes to a file named "three.doc" having a file ID of "789." Assume further that three.doc is copied into Configuration C, as represented by line 1606, and given a new file ID of "999," and that changes 1 and 2 in Configuration C represent changes to the new file. Finally, the changed file is merged back into Configuration B, as represented by line 1608.

This merge would be a three-way merge between the original version of the file in Configuration B, the modified version in Configuration C, and the modified version in Configuration B. Absent other information, the system would not know to merge the modified file from Configuration B with the original version from which it was copied, because the file IDs for the two versions are different. In addition, the system also would not know to merge the modified file from Configuration B with the modified file from Configuration C.

In accordance with one embodiment of the present invention, the system maintains information that enables it to identify such conflicts and merge the appropriate files, even though the file IDs are different between the files. This is accomplished by maintaining a Change Tracking Table, and accessing that table each time changes are to be merged from one configuration into another. In one embodiment, the Change Tracking Table stores information describing the copying of a file from one configuration to another and the merging together of files.

FIG. 20 illustrates a Change Tracking Table in accordance with one embodiment of the present invention. Change Tracking Table 2000 has fields for operation type 2002, originating configuration 2004, originating file ID 2006, originating version 2008, destination configuration 2010, destination file ID 2012, and destination version 2014.

Operation type field 2002 stores the type of operation that was performed on the file versions included in the record. For example, an operation type could be a "copy" of a file from one configuration to another, or a "merge" of files from different configurations.

Originating configuration field 2004, originating file ID field 2006, and originating version field 2008 store data identifying the file version that is being copied or merged from one configuration into another configuration.

Destination configuration field 2010, destination file ID 2012, and destination version field 2014 store data identifying the file version that is being created, by a copy operation, or the file into which another file is being merged, by a merge operation.

Referring to FIG. 16, assume that arrow 1606 represents the copying of a file, named "three.doc" and having a file ID of "789" from Configuration B to Configuration C, where the file in Configuration C is assigned a new file ID of "999." This copy operation is represented in Change Tracking Table 2000 as record 2021. Assume further that arrow 1608 represents the merging of three.doc from Configuration C back into Configuration B. This merge operation is represented in Change Tracking Table 2000 as record 2022.

Referring back to FIG. 17, the system determines merge-related information, in block 1706, by checking the originating configuration, file ID, and version fields 2004, 2005, 2006, 2007, and 2008 to determine whether any operations have been performed on the files being merged that might affect that merge. For example, a three-way merge would be necessary between the original file three.doc having file ID of "789" in Configuration B, the version of the file having file ID of "999" in Configuration C after it had been modified, and the modified file having file ID of "789" in Configuration B into which the file is being merged. By storing information relating to copies and merges, the system is able to identify the file version from which a subsequent file version was derived, even though the file versions have different file IDs. This enables the system to determine which file versions should be included when the new file version is merged back into the originating configuration.

Referring back to FIG. 17, after the merge-related information is determined in block 1706, the changes are incorporated between the configurations in block 1708 (e.g., via merge and/or copy operations), and the method ends.

Constructing Configurations

The processes described above of creating configurations, tracking changes to configurations, and incorporating changes between configurations are all performed so that any version of a configuration can be constructed or reconstructed exactly as it existed at any point along its history line.

FIGS. 21-28 illustrate construction of a configuration (state 608, FIG. 6) in accordance with embodiments of the present invention. As described below, in accordance with various embodiments of the present invention, the relational information and tracking information described above is used to identify all file versions that pertain to any version of a configuration, along with the properties and property values that pertain to those file versions. Those file versions and properties can then be assembled together to construct or reconstruct the desired version of the configuration.

Figure 21:
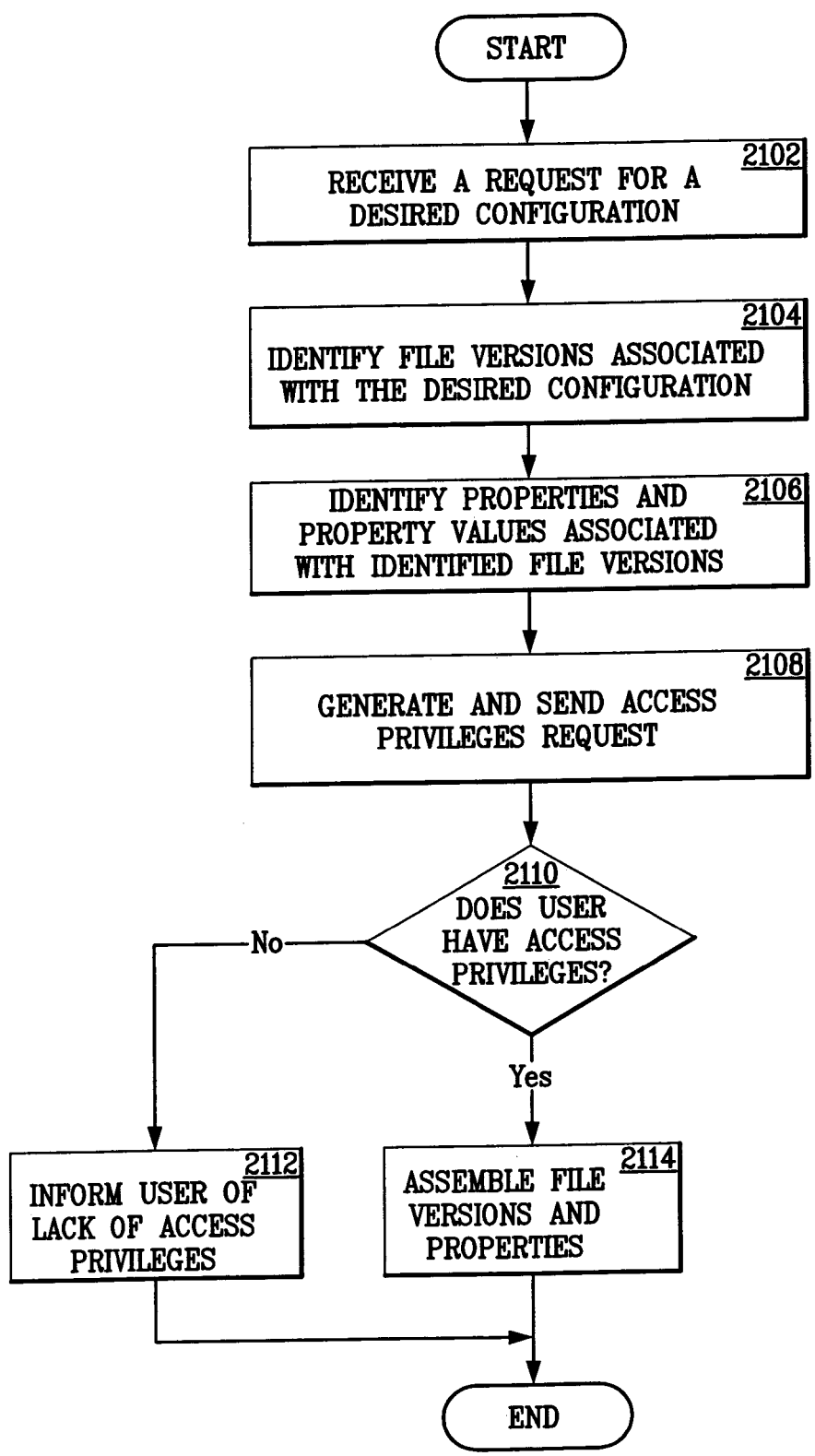
FIG. 21 illustrates a flowchart of a method for constructing a configuration in accordance with one embodiment of the present invention.

FIG. 21 illustrates a flowchart of a method for constructing a configuration in accordance with one embodiment of the present invention. The method begins, in block 2102, when a request is received to create a configuration, referred to below as the "desired configuration." In one embodiment, the request specifies the name or configuration ID for the desired configuration, and also specifies the date as of which the desired configuration is to be constructed, referred to below as the "desired date." The desired date also could include a time. For example, the request could specify that it wants Configuration A to be constructed as it was on Dec. 10, 1999 at 17:00:00.

In block 2104, the file versions associated with the desired configuration are identified from the information specified in the request. The file versions are identified as the oldest versions of the configuration's files that were checked into the configuration on or before the desired date.

Figure 22:
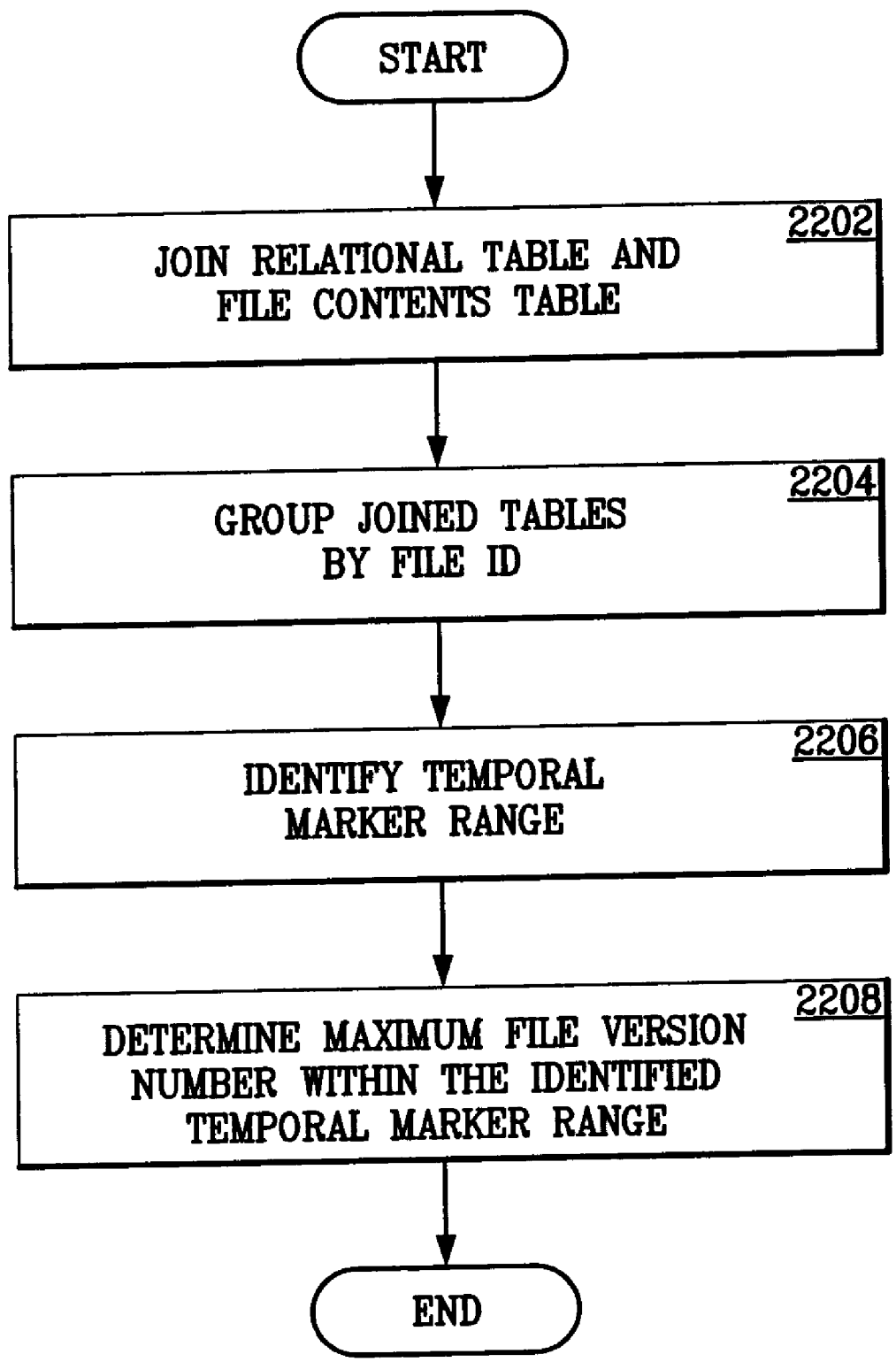
FIG. 22 illustrates a flowchart of a method for identifying file versions associated with a desired configuration in accordance with one embodiment of the present invention.

FIG. 22 illustrates a flowchart of a method for identifying file versions associated with a desired configuration in accordance with one embodiment of the present invention. The method uses relational database techniques to evaluate data stored in various tables in order to determine the appropriate file versions. The use of relational database techniques is desirable because it reduces the amount of data that would need to be stored in a single table by removing redundancies in the data. In one embodiment, the tables used to identify file versions include a Configuration Table (e.g., FIG. 9), a File Contents Table (e.g., FIG. 13), and a Relational Table (e.g., FIGS. 10, 19).

In order to determine which file versions apply to a particular configuration at a particular time, one needs to identify which changes along the history line of the desired configuration and any related configurations apply, and then to translate those changes into the identities of file versions.

The method begins, in block 2202, by joining the File Contents Table (e.g., Table 1300, FIG. 13) and the Relational Table (e.g., Table 1900, FIG. 19). In one embodiment, the method is implemented using Structured Query Language (SQL), and a JOIN operation is executed to join the two tables. When tables are joined, columns of matching records are combined to create a virtual table that includes all information from both tables. Thus, the joined File Contents Table and Relational Table results in a virtual table that contains all file version information and all relational information.

In block 2204, the joined tables are grouped by file ID. In an embodiment using SQL, a GROUP BY operation would be executed to group the file versions together. This grouping results in the virtual table with all versions of each file grouped together. FIG. 23 illustrates a modified version of the table illustrated in FIG. 13 grouped by file ID. For ease of illustration, the relational information is not included in the table. Records 2301, 2302, 2303, 2304, 2305, 2306, 2307, 2308, 2309, 2310, and 2311 include all versions of files having the file ID of "123". Records 2312, 2313, 2314, 2315, 2316, 2317, and 2318 include all versions of files having the file ID of "456."

Referring back to FIG. 22, the range of temporal markers corresponding to the desired configuration is identified, in block 2206. Essentially, this involves identifying the relational information (i.e., from the joined Relational Table) that applies to the desired configuration at the desired date.

Determining the applicable range of temporal markers is done, in one embodiment, by determining which is the largest temporal marker along the history line for the desired configuration that occurs closest to but before the desired date. This can be determined by comparing the desired date to the date/time field (1310, FIG. 13), and finding the maximum date that is less than the desired date for a record that is associated with the desired configuration. Thus, for example, if the desired configuration is Configuration B, and the desired date is Feb. 25, 2000, then the largest temporal marker is "4," which occurs in record 2311.

In one embodiment, the desired configuration also can be specified using a temporal marker, instead of a date. If that is the case, the relational information that applies to the desired configuration is determined, in block 2206, by comparing the desired temporal marker to the temporal marker field (1308, FIG. 13), and finding a matching temporal marker.

From that temporal marker, the applicable relational information is determined. If the temporal marker falls within the lower and upper limits (e.g., fields 1004 and 1006, FIG. 19) for the desired configuration, then the set of relational information corresponding to that lower and upper limit applies. For example, referring to FIG. 19, if the desired configuration is Configuration B, and the temporal marker is the $4^{th}$ temporal marker, then the relational information that applies would be the relational information stored in records 1910, 1911, 1912, and 1913, since the $4^{th}$ marker falls within the lower limit of 3 and the upper limit of infinity. Thus, in the example given, all file versions associated with changes to Configuration B from 0 to infinity, and all file versions associated with changes to Configuration A from 0 to 6 apply to the desired configuration.

Referring back to FIG. 22, in block 2208, the maximum file version for each file within the temporal marker range is determined. This is done by identifying a set of file versions that correspond to temporal markers within the range of the applicable relational information, and then finding the maximum version for each of the files. For example, referring to FIG. 23, records 2305, 2307, 2309, and 2311 include changes made within Configuration B from 1 to infinity, and records 2301, 2302, 2304, 2304, 2306, 2313, and 2315 include changes made within Configuration A from 0 to 6.

The date/time field (1310, FIG. 23) is evaluated to identify the latest versions of the files within the desired configuration or any related configurations that existed on or before the desired date. In an embodiment using SQL, these versions can be identified using MAX and WHERE operations on the date/time field for each set of versions that corresponds to a file.

The MAX and WHERE operations identify, from the set of versions within the given temporal marker range for each file, the version of each file that has the latest date that is earlier than or equal to the desired date. Alternatively, as explained previously, a desired temporal marker could be specified instead of a desired date, and the MAX and/or WHERE operations could be used to identify the latest version that corresponds to the desired temporal marker, or an earlier temporal marker.

In the given example, this results in the identification of version 11 of file "one.doc" (record 2311, FIG. 23) and version 4 of file "dos.doc" (record 2315, FIG. 23). In alternate embodiments, the MAX and/or WHERE operations could be performed instead on the temporal marker field 1308 or the file version field 1306, rather than the date/time field 1310. After determining, for each file in the desired configuration, the maximum file version that is within the given temporal marker range, the method ends.

Referring back to FIG. 21, once all file versions have been identified in block 2104, the properties and property values for those file versions are identified in block 2106. The properties and property values are identified as those properties and their values that were associated with the identified file versions as of the desired time.

Figure 24:
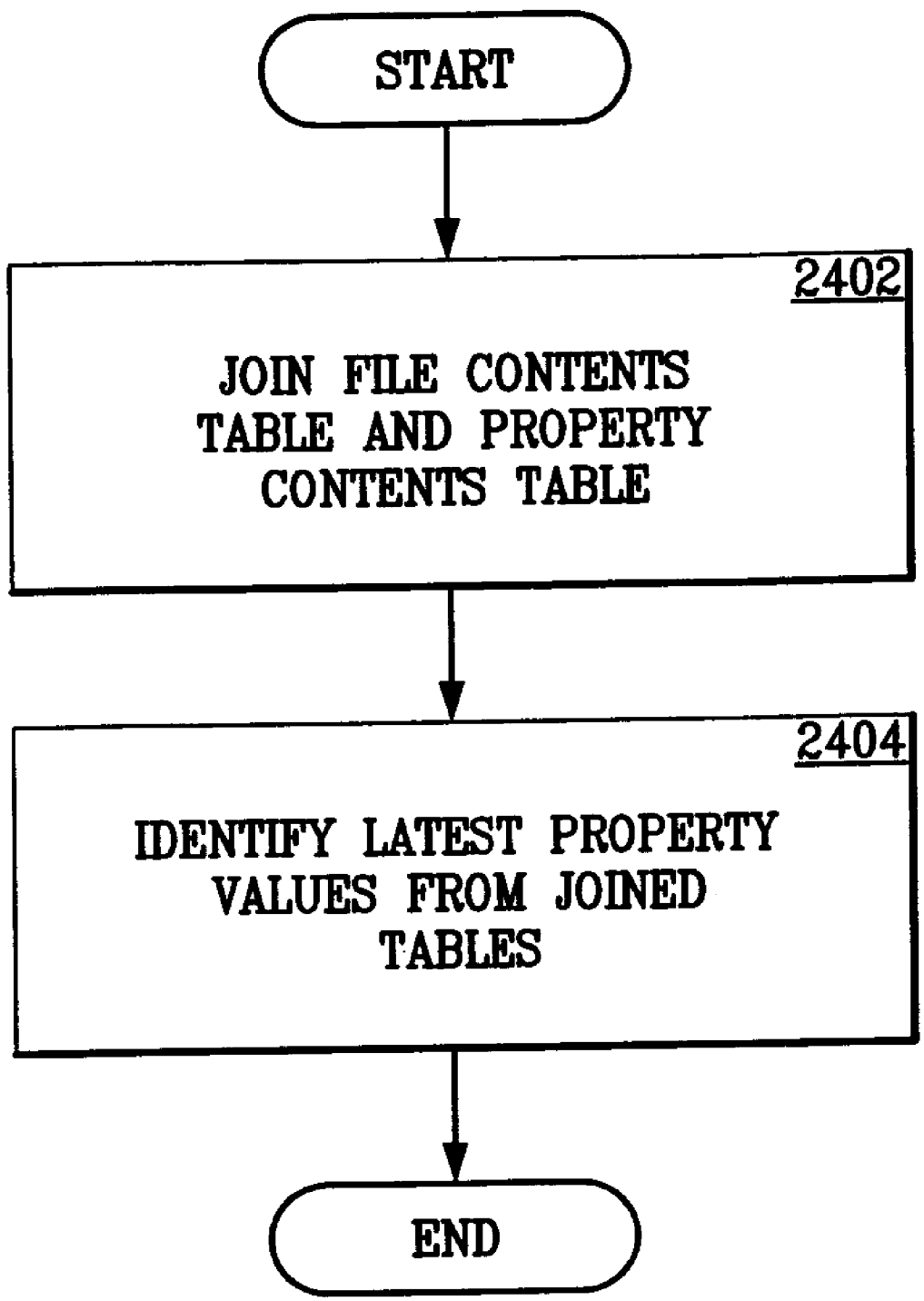
FIG. 24 illustrates a flowchart of a method for identifying properties and property values associated with file versions within a desired configuration in accordance with one embodiment of the present invention.

FIG. 24 illustrates a flowchart of a method for identifying properties and property values associated with file versions within a desired configuration in accordance with one embodiment of the present invention. As with the method described in FIG. 22, the method uses relational database techniques to evaluate data stored in various tables in order to determine the appropriate properties and property values. In one embodiment, the tables include a File Contents Table (e.g., FIG. 13) and a Property Contents Table (e.g., FIG. 15).

As explained previously, each property is defined by a property name and a property value, and any number of properties could be associated with a file. In addition, the properties associated with a particular file, and the values of those properties can change over time. In accordance with the method of the present invention, it is possible to trace back and determine which properties and which property values correspond to any particular file version.

In order to determine which properties and property values apply to the desired configuration's file versions, the method illustrated in FIG. 24 begins by joining, in block 2402, the File Contents Table and the Property Contents Table. For example, if the method is implemented using SQL, a JOIN operation would be executed to join the two tables. This operation associates the property records with the file IDs, version IDs, and configuration. IDs to which they pertain.

Next, in block 2404, the temporal marker field of the Property Contents Table (1510, FIG. 15) is evaluated to identify the latest property values for each property associated with each file that occurs before the desired date. In an embodiment using SQL, these property values can be identified using a GROUP BY operation on the file ID field, and MAX and/or WHERE operations on the temporal sequence field. After identification of the property values, the method illustrated in FIG. 24 ends.

One advantage to using the method of the present invention is that it is not necessary to copy file version or property information for each configuration. Instead, the relational information is used to determine such information from the immutable history of the configuration being compiled. In other words, the file version and property information are re-used from previous configurations. In addition, the row-based nature of the stored data means that settings from previous versions can be re-used. Such data does not need to be copied.

Once the file versions and property values are identified that correspond to the desired configuration at the desired temporal marker, the configuration can be constructed. In some systems, however, some or all of the file versions may be protected, and it may be desirable to provide access to the identified file versions only to certain users who have specific access privileges. In one embodiment, access privileges are determined before allowing the user to access the identified file versions.

Referring back to FIG. 21, in one embodiment of the invention, a request is generated, in block 2108, to determine whether the user who requested the configuration has the privileges to access the file versions identified in block 2104. That request is sent to the system component that is responsible for controlling file access. In one embodiment, that system component is a database engine. In another embodiment, that system component is a part of the configuration management system.

From the access privileges request, a determination is made, in block 2110, whether the user has sufficient access privileges to receive those file versions. A method for determining access privileges in accordance with one embodiment of the present invention is described in conjunction with FIGS. 25-28.

Figure 25:
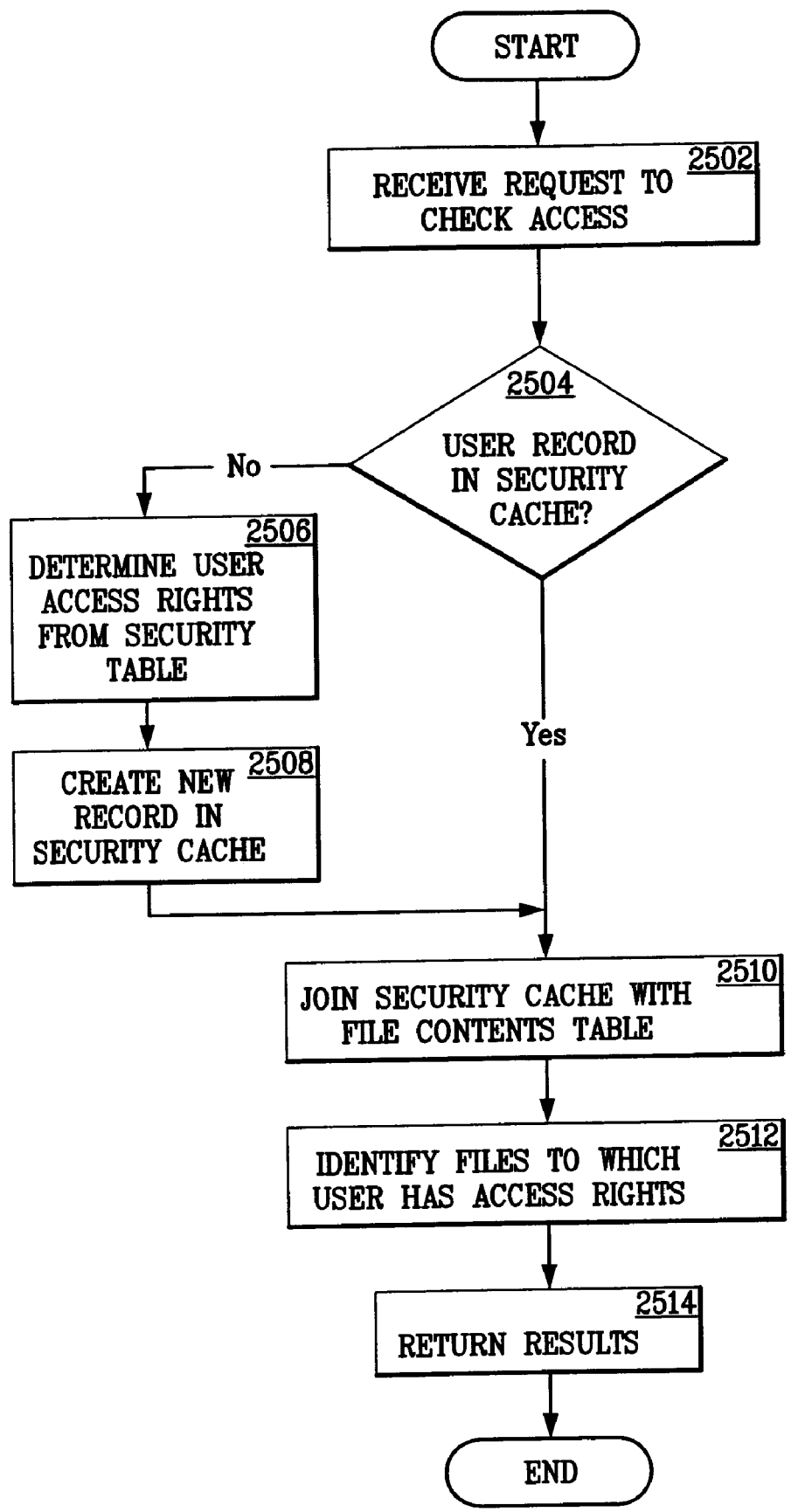
FIG. 25 illustrates a flowchart of a method for determining a user's access privileges in accordance with one embodiment of the present invention.

FIG. 25 illustrates a method for determining whether a user has access privileges for file versions of a particular configuration in accordance with one embodiment of the present invention. The method could be performed by the same or a different computer than the computer responsible for implementing the configuration management system. In one embodiment, the method is performed by the computer that manages the project's version store.

The method begins, in block 2502, when a request to check a user's access privileges is received. In one embodiment, the request includes a user ID and/or security ID that uniquely identifies each user, and information that enables the system to determine which files the user would like to access. In one embodiment, this information includes the configuration ID for the desired configuration. In another embodiment, this information includes the file IDs for the desired file versions.

The method then determines, in block 2504 whether a record for the user exists in a dynamic cache referred to herein as the Security Cache. The Security Cache maintains user capabilities information for those users who have requested access to files. By maintaining this information in the Security Cache, the information need not be recomputed each time the user requests access.

FIG. 26 illustrates a Security Cache in accordance with one embodiment of the present invention. In one embodiment, Security Cache 2600 includes fields for user ID 2602, security ID 2604, user capabilities 2606, and date/time stamp 2608. User ID field 2602 stores unique user IDs that indicate whose security information the corresponding records pertains to. Security ID field 2604 includes the user's unique name, which is used by the system to identify the user for security purposes. In one embodiment, the user ID and security ID could be the same for a user.

User capabilities field 2606 indicates what files the user is allowed to access, and what types of operations the user is allowed to perform on those files. Operation types include reading, writing to, deleting, creating, appending, allocating, modifying and executing a file. For example, a particular user may be allowed only to read files from Configuration A, but may be allowed to read, write to, create, modify, and delete files in Configuration B. These user capabilities are derived from information within a Security Table, as described in conjunction with FIGS. 27 and 28.

Date/time stamp field 2608 stores a date/time stamp that indicates when each record was placed onto the Security Cache. This information is used, in one embodiment, to ensure that the records in the Security Cache are current. In one embodiment, older records are periodically removed and the user capabilities are recomputed and placed back in the cache. In other embodiments, the process of removing and recomputing older records from the Security Cache could be performed continuously or aperiodically.

Figure 27:
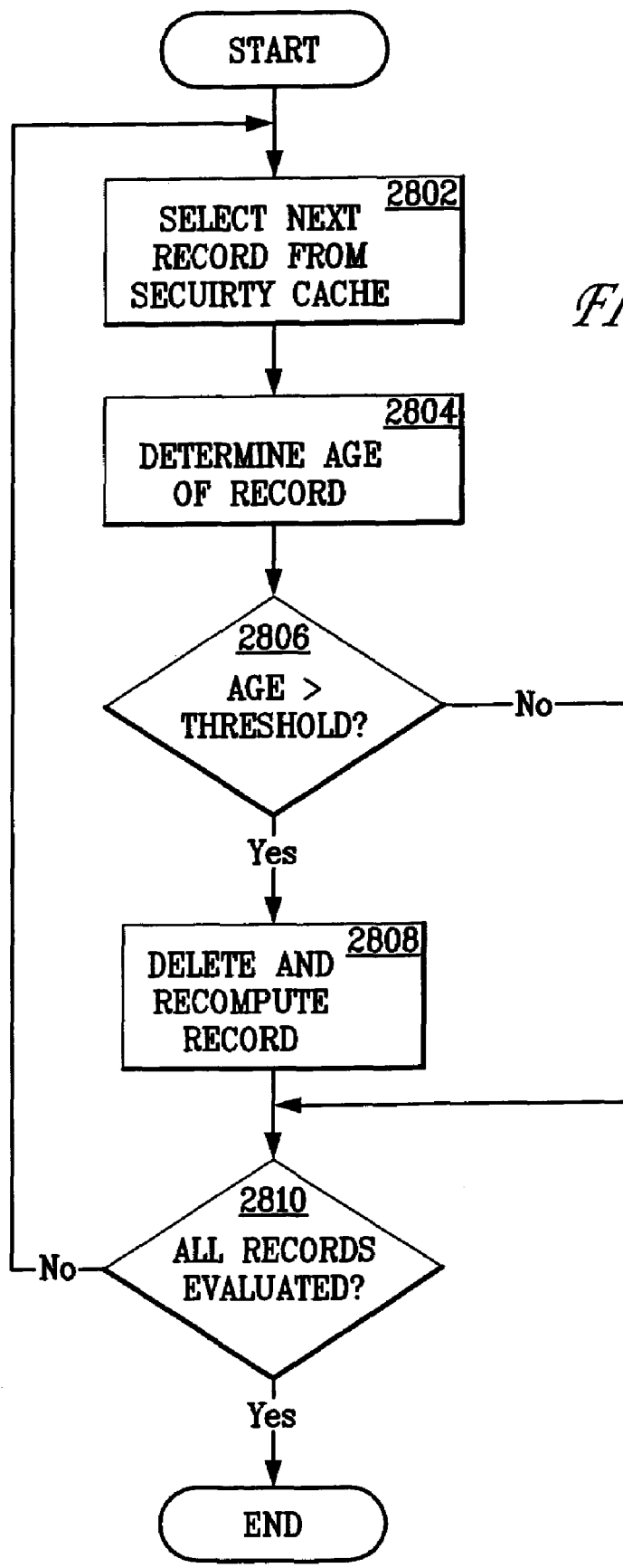
FIG. 27 illustrates a flowchart of a method for automatically removing and recomputing records in the Security Cache in accordance with one embodiment of the present invention.

FIG. 27 illustrates a method for automatically removing and recomputing records in the Security Cache in accordance with one embodiment of the present invention. The method begins, in block 2702, when a record is selected from the Security Cache. In one embodiment, during the first iteration of the method, the first record selected is the oldest record in the cache. In other embodiments, some other record could be the first selected record.

In block 2704, the age of the record is determined by comparing the value in the date/time stamp field 2608 with the current time. The difference between these two values indicates the age of the record.

A determination is then made, in block 2706, whether the age is greater than a threshold value that is typically set by the system administrator. In one embodiment, the threshold is a predetermined, static value.

If the age of the record is greater than the threshold, then the record is deleted from the Security Cache, in block 2708, and the user capabilities are recomputed using the Security Table, as described below. Because access tokens and/or security descriptors may occasionally be changed in the Security Table (FIG. 28), deleting older records and recomputing user capabilities ensures that the Security Cache will have up-to-date user capabilities information.

If the age of the record is not greater than the threshold, or after deleting and recomputing the record, a determination is made, in block 2710, whether all records in the cache have been evaluated. If so, the method ends. If not, the method iterates as shown in FIG. 27.

Referring back to FIG. 25, if block 2504 determines that no record exists for the specified user ID in the Security Cache, then the user's access rights are determined, in block 2506 from a table, referred to herein as a Security Table. The Security Table includes all unique security descriptors in the system. Basically, the user's access token is compared with the system's security descriptors to determine what type of user capabilities the user has.

FIG. 28 illustrates a Security Table in accordance with one embodiment of the present invention. In one embodiment, Security Table 2800 includes fields for user ID 2802, security ID 2804, access token 2806, and security descriptor 2808. As with FIG. 26, user ID field 2802 stores user IDs that indicate whose security information the corresponding record pertains to, and security ID field 2804 includes the user's unique name, which is used by the system to identify the user for security purposes.

Access token field 2806 includes a list of groups that a user is a member of, and a list of privileges that are enabled and disabled for the user, among other things. Security descriptor field 2808 includes the system's security descriptors. Security descriptors protect files from unauthorized access by indicating who has what type of access to the files. For example, the Security descriptor field 2808 could include a discretionary access control list, which indicates which individuals or groups are allowed what type of access.

Referring back to FIG. 25, after the user's access rights have been determined in block 2506, a new record is created, in block 2508, in the Security Cache (e.g., cache 2600, FIG. 26), and the user's access rights are stored in that record. By storing this information in the Security Cache, it is not necessary to recompute a user's capabilities each time the user requests access.

After block 2508, or if, in block 2504, a determination was made that an entry corresponds to the user in the Security Cache, then the Security Cache (e.g., cache 2600, FIG. 26) and the File Contents Table (e.g., 1300, FIG. 13) are joined in block 2510. This joining of tables, which could be performed using a SQL JOIN operation in one embodiment, results in a virtual table that includes all access information for all versions of all files of the project for those users having records in the Security Cache.

Next, in block 2512, those files, within the desired configuration, to which the user has access rights are identified from the joined tables. By comparing the user capabilities with the file IDs and configuration IDs, the system can determine which files within which configurations the user is allowed to access. The results of the access determination are then returned to the requester, in block 2514, and the method illustrated in FIG. 25 ends. The method of FIG. 25 illustrates that, in one embodiment, security is applied essentially using a join operation, once the Security Cache is ready.

In one embodiment, the results of the access determination method could take the form of a list of filenames or file IDs for the files to which the user has access privileges, along with a description of the access privileges for each file. The user's access privileges could be different for various files within the configuration. For example, the user may have read only privileges for some files, read/write privileges for other files, and no access privileges for still other files of a particular configuration.

Referring back to FIG. 21, if it is determined in block 2110 that the user does not have access privileges for one or more file versions that comprise the desired configuration, then the user is informed of his or her lack of access privileges in block 2112, in one embodiment. In another embodiment, the files for which the user does not have sufficient permission are hidden from the user, so that the user is unaware of their existence. After block 2112, the method ends.

If the user does have access privileges for the file versions that comprise the desired configuration, then the identified file versions and their properties are assembled, in block 2114, from stored versions of the files identified in block 2104 and from the property values identified in block 2106. The method then ends. As will be described below in conjunction with FIGS. 30-32, in one embodiment of the invention, it may be necessary to reconstitute one or more of the file versions that comprise the desired configuration.

From the above description, it should be apparent that the method of the present invention enables any prior version of any configuration to be reconstructed at any point along its history line. This is accomplished using simple table manipulation techniques as described above. In addition, because each file has a unique file ID that is independent of the filename and path information, the system can trace back and find previous file versions, even where the file has been moved or renamed.

Although an embodiment has been described that uses relational database techniques to evaluate data within certain tables, in an alternate embodiment, one or more non-relational tables could be used to store the information needed to determine the appropriate file versions or properties. In other embodiments, tables having differently arranged data fields could also be used. Thus, although specific tables having specific data fields have been described herein, it would be obvious to one of skill in the art based on the description herein that, in alternate embodiments, non-relational database techniques could be used, and/or the data fields within the evaluated tables could be organized differently. Many variations of the tables could be implemented by those of skill in the art based on the description herein, and all such variations are intended to fall within the scope of the present invention.

Method for Version Compression and Reconstitution

The method for configuration management described above enables any version of any configuration to be reconstructed at any time during the history of the project. In the table-driven embodiment described, this is accomplished using a relatively small amount of memory or disk space, since information regarding file versions and properties can be re-used between configurations.

The method of the present invention further reduces the amount of memory or disk space needed to implement the configuration management system by compressing and reconstituting file versions, rather than storing full content copies of each version of a file. In one embodiment, the file version compression and reconstitution method is automatically performed by the system.

Accordingly, in one embodiment, a table is maintained by the system with information the system uses to automatically compress and reconstitute file versions. FIG. 29 illustrates a File Compression Data Table in accordance with one embodiment of the present invention. Table 2900 includes fields for file ID 2902, version 2904, request counter 2906, compression type 2908, reconstitution status 2910, and date/time stamp 2912.

Within file ID field 2902, the file IDs are stored for every file associated with the project. A record is included in the table for each version of each file, where the version number is indicated in version field 2904.

The request counter field 2906 stores a request counter for any file that is in a compressed state. A request counter is a running counter of the number of requests that are made for a compressed file. As described below in conjunction with FIGS. 30 and 31, that request counter is incremented each time a request for the file is received, and is also periodically decremented.

Compression type field 2908 indicates what type of compression is applied to a particular file version. This field is useful in identifying when a file version is compressed or not, and also when one of several compression types could be applied to various files in the version store. For example, no compression could be applied to the file (indicated as "NONE" in field 2908), the file could be compressed using reverse delta compression (indicated as "REVERSE" in field 2908) as is done in one embodiment and explained in more detail in conjunction with FIGS. 30 and 31, or the file could be compressed using forward delta compression, LZH, ZIP, or other known compression techniques, as is done in some prior art systems. In one embodiment, compression is not file-type sensitive, although it could be file-type sensitive in another embodiment.

In an alternate embodiment, this field could store a binary value, for example, where a binary 1 indicates that the file version is compressed, and a binary 0 indicates that the file version is not compressed, or vice versa. The system evaluates this field, as described below in conjunction with FIG. 30, to determine what type of compression has been applied to a particular file version.

Reconstitution status field 2910 indicates whether the file version has been reconstituted by the system. A reconstituted file version is a file version that once was compressed, but has been uncompressed by the system and stored in the version store as a full content copy, in accordance with one embodiment. The reconstitution status field 2910 could store a binary value, for example, where a binary 1 indicates that the file version is reconstituted, and a binary 0 indicates that the file version is not reconstituted, or vice versa. For ease of description, as used in Table 2900, a "YES" in the field indicates that the file version is reconstituted, and a "NO" indicates that the file version is not reconstituted. The system evaluates this field, as described below in conjunction with FIG. 31, to determine whether the system recently reconstituted the file version.

Finally, date/time stamp field 2912 indicates the time and/or date that a particular reconstituted file was reconstituted by the system. As will be explained below in conjunction with FIG. 31, this information is used by the system to determine whether a reconstituted file has aged long enough to be compressed again.

Figure 30:
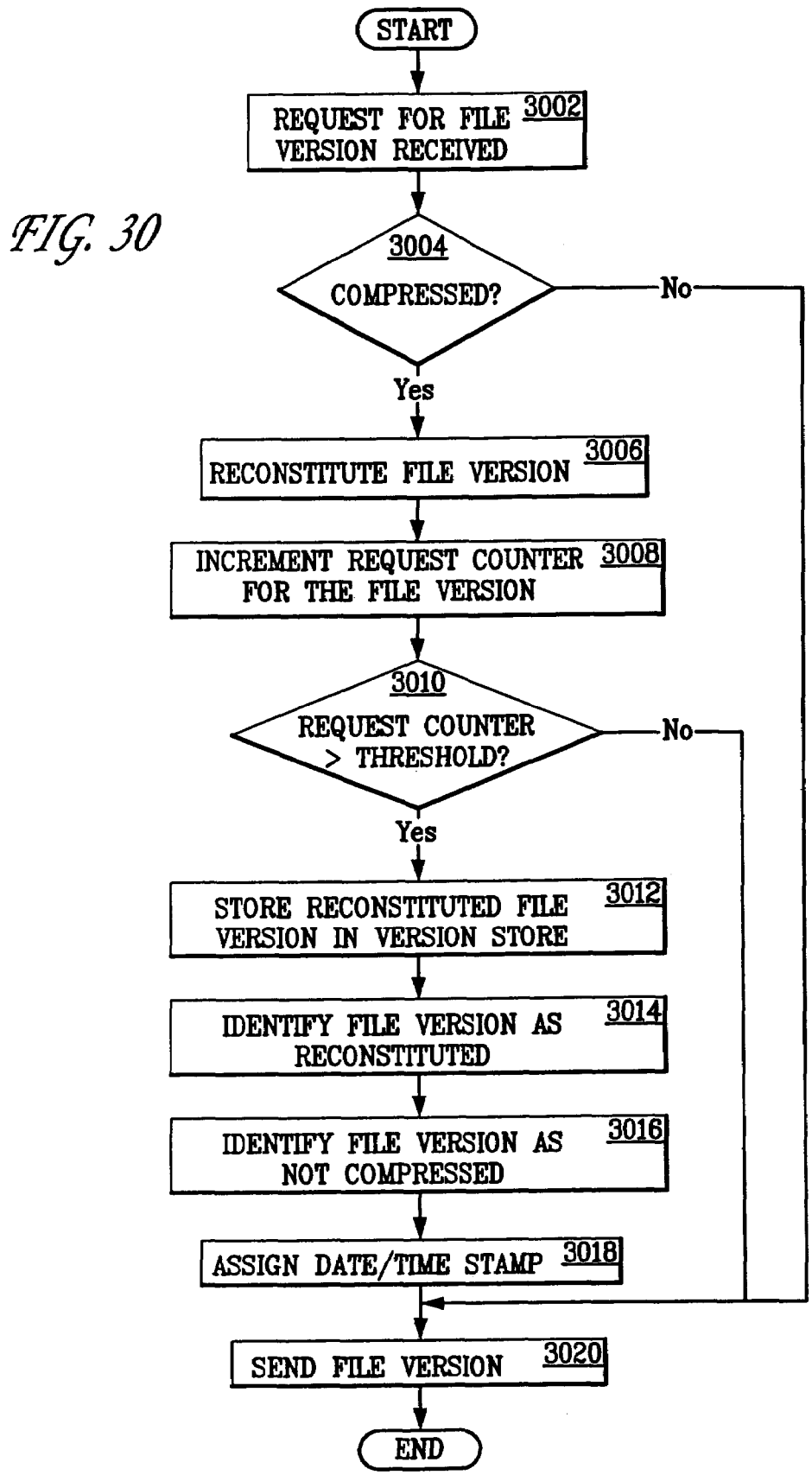
FIG. 30 illustrates a flowchart of a method for performing automatic file version reconstitution in accordance with one embodiment of the present invention.

FIG. 30 illustrates a method for performing automatic file version reconstitution in accordance with one embodiment of the present invention. The method begins, in block 3002, when the system receives a request for a version of a file that is stored within the version store. In one embodiment, the request indicates the filename or file ID for the file, along with the desired version number or some other information (e.g., a date) that enables the system to determine which file version is desired.

As will be described in detail below in conjunction with FIG. 31, the system stores some file versions in a compressed state in order to reduce the amount of memory or disk space required to store all versions of every file of a project. These files could be compressed using any of a number of commonly used data compression techniques that are well known to those of skill in the art.

For example, the files could be compressed using forward or reverse deltas, where a "delta" is a compressed file version that shows any changes between that version and the immediately previous version or some other uncompressed version. In general, forward delta compression maintains the initial version of a file in an uncompressed state, and saves deltas for all subsequent versions. Reverse delta compression maintains the most recent file version in an uncompressed state, and saves deltas for all previous versions. Either way, when a compressed version is to be uncompressed, a system will build the version from the uncompressed file (e.g., the initial version, the most recent version, or some other version), the delta for the desired version, and any intervening deltas between the desired version and the uncompressed version. In alternate embodiments, the files could be compressed using general data compression techniques.

In block 3004, a determination is made whether the requested file version is stored in a compressed state in the system's version store. In one embodiment, this determination is made by evaluating the compression type field of the File Compression Data Table (2908, FIG. 29). If the file is not stored in a compressed state, then the file version is sent to the requester, in block 3020, and the method ends.

If a determination is made, in block 3004, that a file is stored in a compressed state, then the file version is reconstituted in block 3006. Reconstitution of a file uses an inverse process to the process used to compress the file, resulting in a full content copy of the original version of the file. For example, if the file is compressed using delta compression, the file is reconstituted by rebuilding the file from its delta, an uncompressed version of the file, and any intervening deltas, as described previously.

In block 3008, a request counter (e.g., field 2906, FIG. 29) for that file version is then incremented. As described above, in one embodiment, each version of a file has an associated request counter. The request counter indicates how many requests have been made for a particular file version that is stored in a compressed state in the version store.

In block 3010, a determination is made whether the request counter is greater than a threshold value. In one embodiment, the threshold value is a predetermined integer value that could range anywhere from one to hundreds or thousands. In another embodiment, the threshold value could be a dynamic value that depends on some system parameter, such as the amount of memory or disk space available or the desired average time to return a file version to a requester, for example.

If the request counter is not greater than the threshold value, then the reconstituted file version is returned to the requester, in block 3020, and the method ends.

If the request counter is greater than the threshold value, then, in block 3012, the reconstituted file version from block 3006 is stored in the version store, replacing the compressed version of the file. This makes the file version more rapidly accessible for future requests. In an alternate embodiment, the compressed version of the file is not replaced, but is retained in the version store, as well. Retaining the compressed version enables the system to revert to the compressed version much faster (e.g., in block 3118, FIG. 31).

In block 3014, the reconstituted file version is identified as reconstituted. In one embodiment, this is done by setting (e.g., changing to "YES") the indicator in the reconstitution status field of the File Compression Data Table (2910, FIG. 29). As will be further discussed in conjunction with FIG. 31, this indication will keep the system from immediately recompressing the reconstituted file version.

In block 3016, the reconstituted file version is identified as not compressed. In one embodiment, this is done by clearing (e.g., changing to "NONE") the indicator in the compression type field of the File Compression Data Table (2908, FIG. 30).

A time/date stamp is then assigned to the file version in block 3018. In one embodiment, this is accomplished by storing the current date and system time in the date/time stamp field of the File Compression Data Table (2912, FIG. 30). As will be further discussed in conjunction with FIG. 31, the date/time stamp enables the system to determine whether a reconstituted file has aged enough to consider compressing it again.

The method then sends the reconstituted file to the requester in block 3020 and ends.

Figure 31:
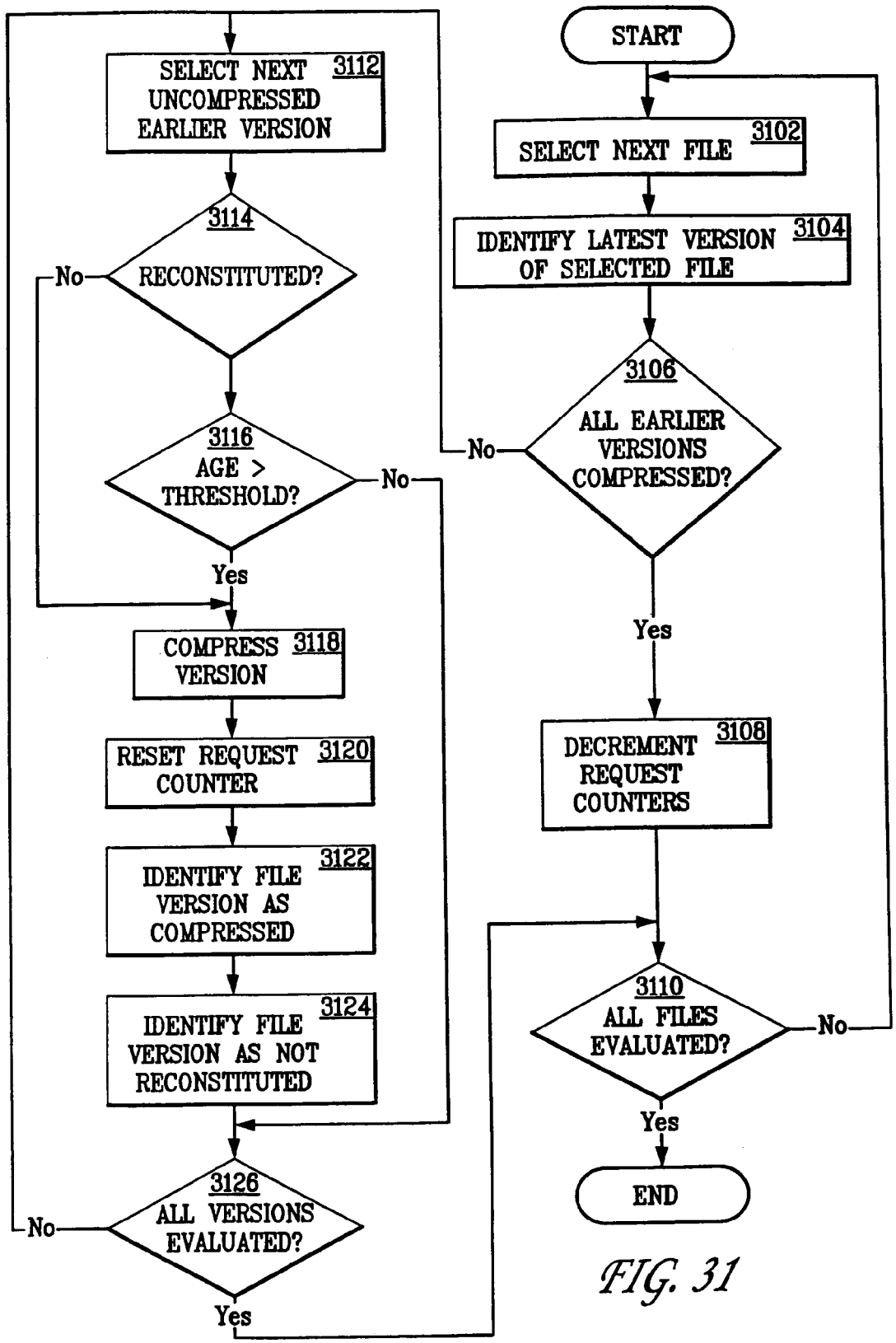
FIG. 31 illustrates a flowchart of a method for performing automatic file version compression in accordance with one embodiment of the present invention.

A companion method to the file reconstitution method described in conjunction with FIG. 30 is illustrated in FIG. 31, which shows a method for performing automatic file version compression in accordance with one embodiment of the present invention. The method is performed periodically, in this embodiment, although it could be performed aperiodically or continuously in other embodiments.

The method begins, in block 3102 by selecting a file that is managed by the configuration management system. For example, if the unique file ID is a number, in the first iteration of the method, the selected file could be the file having the lowest file ID number. In other embodiments, different files could be selected in the first iteration of the method.

In block 3104, the latest version of the selected file is identified. In one embodiment, this is done by grouping the File Contents Table (e.g., Table 1300, FIG. 13) by file ID, and determining which file version for the selected file ID has the largest version number.

A determination is then made, in block 3106, whether all earlier versions of the selected file are in a compressed form. In one embodiment, this is performed by evaluating the compression type field of the File Compression Data Table (2908, FIG. 29) for each earlier version of the file.

If all earlier versions are compressed, then the request counters (e.g., field 2906, FIG. 29) for each earlier version are decremented in block 3108. As discussed in conjunction with block 3008 of FIG. 30, each version of a file has an associated request counter, which indicates how many requests have been made for a particular compressed file version since the file version was compressed. The purpose of incrementing the request counter in block 3008 (FIG. 30) is to help the system monitor the number of requests for a particular file version. If the file version is sufficiently popular, then, as discussed in conjunction with FIG. 30, the file version is reconstituted.

Since the version compression method described in FIG. 31 is periodic in one embodiment, the effect of decrementing the request counter in block 3108 is to enable the system to monitor the frequency of requests, as well as the number. If a file version has not been requested within a relatively long period of time, the request counter eventually will be decremented to zero. On the other hand, if the system is receiving sufficiently more requests for the file than it is performing iterations of the method of FIG. 31, the request counter ultimately will exceed the threshold for reconstituting the file version. In one embodiment, the request counter is decremented by one, although the request counter could be decremented by more than one, depending on how frequently the method of FIG. 31 is executed, and how fast the system wants to decrement its request counters.

In one embodiment, request counters are maintained only for compressed file versions. In other embodiments, request counters could be maintained for uncompressed and/or reconstituted versions as well. This would enable the system to continue to monitor the popularity of a particular file version even while the version is uncompressed.

After decrementing the request counters, a determination is made whether the version compression type for all the project files has been evaluated in block 3110. If not, the procedure iterates as shown in FIG. 31. If so, the method ends.

If a determination is made, in block 3106, that all earlier versions are not compressed, then an uncompressed earlier version is selected for processing in block 3112. In one embodiment, the uncompressed earlier version having the lowest version number is selected for the first iteration, but other versions could first be selected in other embodiments.

The method shown in FIG. 31 is used to compress file versions in two cases: 1) to compress earlier versions of a file after a new version has been created; and 2) to re-compress previously compressed files that have been reconstituted. Compression in the first case is relatively straightforward. Basically, compression is applied when a newer version exists that is not reconstituted. Compression in the second case is performed only when the previous versions are reconstituted, and those previous versions are older than a certain threshold age, as is determined in blocks 3114 and 3116.

A determination is made, in block 3114, whether the uncompressed earlier version is a reconstituted version. In one embodiment, this determination is made by evaluating the reconstitution status field of the File Compression Data Table (2910, FIG. 29) for the version of the file.

If the version does represent a reconstituted version, then the system determines whether the version has been reconstituted for a threshold period of time in block 3116. The purpose of this determination is to avoid re-compressing reconstituted versions immediately after they have been reconstituted. Instead, the system keeps those versions in an uncompressed state for at least a threshold period of time before re-compressing them. The age of the reconstituted file version is determined by comparing the value in the time/date stamp field of the File Compression Data Table (2912, FIG. 29) with the current system date and time.

If the difference is greater than the threshold age, or if a determination had been made in block 3114 that the file version was not reconstituted, then the file version is compressed in block 3118, using data compression techniques well known to those of skill in the art, such as forward delta, reverse delta, or other general data compression techniques, for example.

At that time, the request counter is reset in block 3120, and the compression type indicator (2908, FIG. 29) is set (e.g., changed to "REVERSE"), in block 3122, to indicate that the file version is compressed using one embodiment of the method of the present invention. In addition, the reconstitution status indicator (2910, FIG. 29) is cleared (e.g., changed to "NO") in block 3124.

After block 3124, or after a determination was made in block 3116 that the reconstituted version age does not exceed the threshold, a determination is made whether all uncompressed versions of the file have been evaluated in block 3126. If not, the procedure iterates as shown in FIG. 31.

If so, the method proceeds to block 3110, where a determination is made whether the version compression status for all files has been evaluated. If not, the procedure iterates as shown in FIG. 31. If so, the method ends.

The method shown in FIG. 31 bases the decision of whether or not to compress a file version on the file version's reconstitution status (block 3114), and how long the reconstituted file has been reconstituted (block 3116). In an alternate embodiment, the system can periodically re-compress all versions that are older than a specific date.

By compressing and reconstituting file versions using the embodiments of the present invention illustrated in FIGS. 29-31, the configuration management system reduces the amount of memory or disk space required to archive the file versions associated with the project. In addition, the system ensures that the most frequently requested file versions are stored as full content copies, thus reducing the time necessary to send these versions to a requester.

CONCLUSION

Embodiments of the present invention provide a method and apparatus for configuration management that enables any version of any configuration to be accurately reconstructed as of any time during its history. In addition, the method and apparatus of the present invention provide accurate configuration reconstruction without consuming relatively large amounts of storage space.

In the foregoing detailed description, reference is made to the accompanying drawings which form a part hereof, and in which are shown by way of illustration specific embodiments in which the invention may be practiced. These embodiments are described in sufficient detail to enable those skilled in the art to practice the invention.

It will be appreciated by those of ordinary skill in the art that any arrangement that is calculated to achieve the same purpose may be substituted for the specific embodiment shown. For example, illustrative embodiments describe an implementation of the invention using relational database techniques, SQL, and various tables. However, those skilled in the art will recognize, based on the description herein, that non-relational database techniques and/or other languages could be used to implement the present invention. In addition the tables used to store various data as described herein could be arranged differently, have different fields, or represent the data using different types of values.

This application is intended to cover any adaptations or variations of the present invention that fall within its scope. The foregoing detailed description is, therefore, not to be taken in a limiting sense, and it will be readily understood by those skilled in the art that various changes in the details, materials, and arrangements of the parts and steps which have been described and illustrated in order to explain the nature of this invention may be made without departing from the spirit and scope of the invention as expressed in the adjoining claims.

We claim:

1. A computer-readable storage medium having computer-executable instructions for performing a method for constructing a desired one of a plurality of configurations of a project, at the request of a user, each of said configurations comprising multiple files, each file having one or more versions, wherein a history of versions is separately tracked for each file in each configuration, the desired configuration being one of said plurality of configurations of the project as of a desired prior time, comprising:

determining a configuration identifier for the desired configuration;

identifying versions of the multiple files that are to be included in the desired configuration as a set of the versions that are associated with the configuration identifier at the desired prior time, wherein the history of versions separately tracked for at least one of the multiple files includes a version that is the same as a version in a history of versions separately tracked for that file in a different configuration; and determining whether the user that has requested the desired configuration has access privileges for the file versions that comprise the desired configuration, and if so, assembling the set of versions to construct the desired configuration.

2. A system for constructing a desired one of a plurality of configurations of a project, at the request of the user, each of said configurations comprising multiple files, each file having one or more versions, wherein a history of versions is separately tracked for each file in each configuration, the desired configuration being one of said plurality of configurations of the project as of a desired prior time, comprising:

means for determining a configuration identifier for the desired configuration;

means for identifying versions of the multiple files that are to be included in the desired configuration as a set of the versions that are associated with the configuration identifier at the desired prior time, wherein the history of versions separately tracked for at least one of the multiple files includes a version that is the same as a version in a history of versions separately tracked for that file in a different configuration; and means for determining whether the user that has requested the desired configuration has access privileges for the file versions that comprise the desired configuration; and means for assembling the set of versions to construct the desired configuration.

* * * * *